(12) United States Patent
Sohma

(10) Patent No.: US 9,413,243 B2
(45) Date of Patent: Aug. 9, 2016

(54) NON-INSULATING TYPE SWITCHING POWER SUPPLY DEVICE

(71) Applicant: Shohtaroh Sohma, Osaka (JP)

(72) Inventor: Shohtaroh Sohma, Osaka (JP)

(73) Assignee: RICOH ELECTRONIC DEVICES CO., LTD., Osaka (JP)

( * ) Notice: Subject to any disclaimer, the term of this patent is extended or adjusted under 35 U.S.C. 154(b) by 85 days.

(21) Appl. No.: 14/021,092

(22) Filed: Sep. 9, 2013

(65) Prior Publication Data

US 2014/0077790 A1    Mar. 20, 2014

(30) Foreign Application Priority Data

Sep. 14, 2012 (JP) ................................. 2012-202318

(51) Int. Cl.
*H02M 3/158*  (2006.01)
*H02M 1/44*   (2007.01)
*H02M 1/00*   (2006.01)

(52) U.S. Cl.
CPC .............. *H02M 3/1588* (2013.01); *H02M 1/44* (2013.01); *H02M 2001/0054* (2013.01); *Y02B 70/1466* (2013.01); *Y02B 70/1491* (2013.01)

(58) Field of Classification Search
CPC ....... H02M 1/44; H02M 3/156; H02M 3/158; H02M 3/1588
USPC .................................. 323/282, 283, 284, 285
See application file for complete search history.

(56) References Cited

U.S. PATENT DOCUMENTS

| | | | | |
|---|---|---|---|---|
| 2007/0120548 A1* | 5/2007 | Kojima | ............... | H02M 3/1588 323/284 |
| 2007/0216388 A1 | 9/2007 | Sohma | | |
| 2007/0216389 A1 | 9/2007 | Nishida | | |
| 2007/0247131 A1 | 10/2007 | Sohma | | |
| 2007/0285077 A1* | 12/2007 | Hasegawa | ............... | H02M 1/38 323/351 |
| 2008/0024100 A1* | 1/2008 | Huang | .................. | H02M 3/158 323/282 |
| 2008/0061755 A1* | 3/2008 | Michishita | .......... | H02M 3/1588 323/282 |
| 2008/0080219 A1 | 4/2008 | Sohma | | |
| 2008/0150508 A1 | 6/2008 | Sohma | | |
| 2009/0135632 A1 | 5/2009 | Sohma | | |
| 2010/0013447 A1 | 1/2010 | Furuse et al. | | |
| 2010/0181977 A1 | 7/2010 | Sohma | | |
| 2011/0043175 A1 | 2/2011 | Sohma | | |
| 2011/0043176 A1 | 2/2011 | Sohma | | |
| 2014/0253083 A1* | 9/2014 | Shao | ....................... | H02M 1/32 323/285 |

FOREIGN PATENT DOCUMENTS

| | | |
|---|---|---|
| JP | 2007-252137 | 9/2007 |
| WO | WO00/13318 A1 | 3/2000 |

* cited by examiner

*Primary Examiner* — Jue Zhang
*Assistant Examiner* — Lakaisha Jackson
(74) *Attorney, Agent, or Firm* — Cooper & Dunham LLP

(57) ABSTRACT

A switching power supply device includes a first control circuit that turns a first switch on when first and second switches are off and a voltage at a junction node therebetween is increased to decrease a voltage across the first switch to a first threshold voltage, turns off when a first ON-period has elapsed from when the first switch is turned on, and lengthens the first ON-period as an output voltage decreases relative to a reference voltage; and a second control circuit that turns the second switch on when both switches are off and a voltage across the second switch is decreased to a second threshold voltage, turns off when a reverse current flows through the inductor, sufficient to increase the voltage at the junction node to decrease the voltage across the first switch to the first threshold voltage after the second switch is turned off.

13 Claims, 17 Drawing Sheets

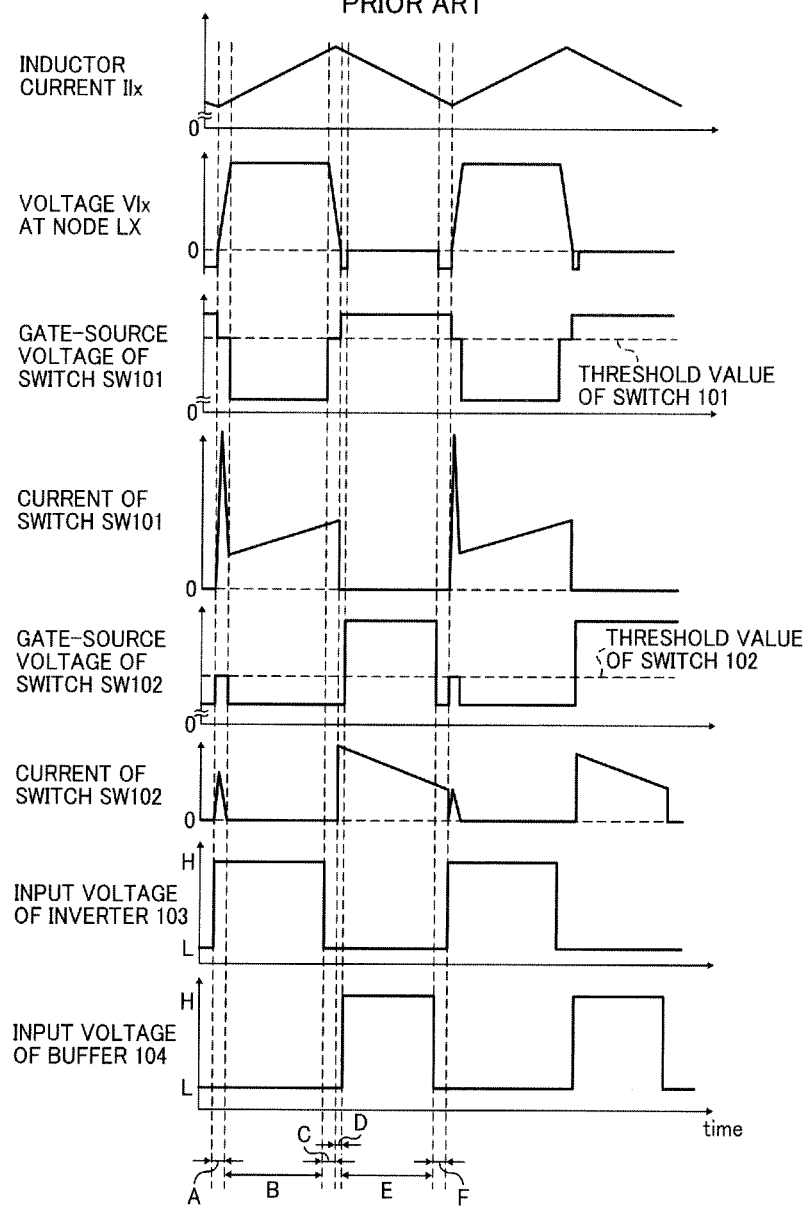

NON-INSULATING TYPE SWITCHING POWER SUPPLY DEVICE

CROSS-REFERENCE TO RELATED APPLICATION

This patent application is based on and claims priority pursuant to 35 U.S.C. §119 to Japanese Patent Application No. 2012-202318, filed on Sep. 14, 2012 in the Japan Patent Office, the entire disclosure of which is hereby incorporated by reference herein.

BACKGROUND

1. Technical Field

The present disclosure relates to a switching power supply device, in particular, a synchronous rectifying non-insulating type switching power supply device.

2. Related Art

As a conventional insulating switching power supply device, for example, flowing inventions are proposed. WO/2000/013318-A proposes a semiconductor device that includes multiple output switching transistors having different on resistances respectively. While the multiple output switching transistors are on-operation, the transistor is turned on in order of the great to small of the on resistance. On the contrary, during off operation, the transistors are turned off in order of small to great of the on-resistance.

In addition, JP2007-252137-A proposes a non-synchronous certificating non-insulating type step-down DC-DC converter that can improve efficiency without increasing the circuit area. With decreasing the load current, an ON-period of a switching transistor is lengthened, the inductor current is decreased, and the load current is further decreased. Then, when the inductor current is decreased to the minimum current value, the voltage is increased to the output voltage, and a rectification transistor is turned off. Therefore, the inductor current stops flowing, which prevents the generation of the reverse current.

Next, example related art of the switching power supply device 100 is described below with reference to FIGS. 13 and 14. FIG. 13 is a block diagram illustrating a configuration of a related-art synchronized rectifying step-down switching power supply device 100. In FIG. 13, the switching power supply device 100 includes a high-side switch SW101 and a low-side switch SW102 connected in series between a voltage source of an input terminal Vin and a ground terminal, an inductor L10 connected between an output terminal VOUT and a junction node LX between the switches SW101 and SW102, and a capacitor C1 to smooth an output voltage at the output terminal VOUT. The switches SW101 and SW102 are, for example, metal-oxide semiconductor field-effect transistor (MOSFET). In FIG. 13, reference character Iout represents the output current generated at the output terminal VOUT, Ilx represents an inductor current represents Ilx, and Vlx represents a voltage at the junction node LX. The switching power supply device 100 further includes a pulse-width modulation (PWM) control circuit 101, a dead time control circuit 102, an inverter 103, and a buffer 104 for controlling the switches SW101 and SW102. The PWM control circuit 101 outputs a signal having a duty ratio that is changed to generate the desired output voltage Vout.

A parasitic capacitance Cp101 is present between a gate and a drain of the switch SW101 and a parasitic capacitance Cp102 is present between a source and the drain of the switch SW1. Similarly, a parasitic capacitance Cp103 is present between a gate and a drain of the switch SW102, and a parasitic capacitance Cp104 is present between a source and the drain of the switch SW102.

FIG. 14 is a timing chart to illustrate the operation of the switching power supply device 100 shown in FIG. 13. Herein, output of the logic circuit is represented as high-level "H" and low level "L". In FIG. 14, 1 cycle of the operation contains represents periods A to F. Below describes the operation of the switching power supply device shown in FIG. 13, with reference to these periods A to F shown in FIG. 14.

In FIG. 14, in the period A, the input voltage of the inverter 103 is H and an output voltage of the inverter 103 is started shifting from H to L, and an input voltage and an output voltage of the buffer 104 are kept in L state. When a gate-source voltage of the switch 101 exceeds a threshold voltage of the switch SW101, the switch 5101 is turned on, and the current starts flowing through a source-drain of the switch SW101, and the voltage Vlx at the junction node Lx is started increasing. As a result, due to the current flowing through the parasitic capacitance Cp101 between the gate and drain of the switch SW101, the output out voltage of the inverter 103 is increased, and the gate-source voltage of the switch SW101 is kept constant near a threshold value of the switch SW101. The output current of the inverter 103 for driving the switch SW1 has limited, and therefore, which can maintain a balance between the output current of the inverter 103 and the current flowing through the parasitic capacitance Cp101 of the gate and the drain of the switch SW101. At this time, the gate-source voltage of the switch SW101 is kept near the threshold voltage of the switch SW101.

In addition, due to the current flowing through the parasitic capacitance Cp103 between the gate and drain of the switch SW102, the output voltage of the buffer 104 is increased, and the gate-source voltage of the switch SW102 is increased. When a gate-source voltage of the switch SW101 exceeds a threshold voltage of the switch SW101, the current is started flowing to the switch SW102. This operation is called as a self-turn on. The current flowing through the switch SW101 contains the inductor current Ilx, and charging currents of the parasitic capacitances Cp101 to Cp104. In addition, while the switch SW102 is the self-turn on operation, the current of the switch SW101 further contains the current flowing through the switch SW102. At this time, loss expressed as a product of the drain-source current and a drain-source voltage is generated in the switch SW101.

When the voltage Vlx at the junction node LX is increased to the input voltage Vin, the process proceeds from the period A to the period B.

In the period B, the switch SW102 is off and the switch SW101 is on. At this time, in the switch SW101, a loss expressed as a product of the on-resistance of the switch SW1 and square of the inductor current Ilx is generated.

In the period C, the input voltage of the inverter 103 is changed to L, and the output voltage of the inverter 103 is transited from L to H, while the input voltage and the output voltage of the buffer 104 are kept L. When the gate-source voltage of the switch SW101 falls below a threshold voltage of the switch SW101, the switch SW101 is turned off, and the voltage Vlx at the junction node LX is started decreasing. As a result, due to the current flowing through the parasitic capacitance Cp101 between the gate and drain of the switch SW101, the output voltage of the inverter 103 is decreased, and the gate-source voltage of the switch SW101 is kept near the threshold value of the switch SW101. At this time, in the switch SW101, loss expressed as a product of the drain-source current and the drain-source voltage thereof is generated.

When the voltage Vlx at the junction ode Lx is decreased, and a voltage difference between the voltage Vlx and a ground voltage (0V) exceeds a threshold voltage of a body diode of the switch SW102, the process proceeds from the period C to the period D.

In the period D, the switches SW101 and SW102 are off. In the periods A to C, the inductor current Ilx is supplied from the switch SW101. Conversely, in the period D, when the voltage Vlx at the junction node LX exceeds a threshold voltage of the body diode of the switch SW102, the inductor Ilx is supplied from the switch SW102 instead of the switch SW101. At this time, the inductor current Ilx flows through the body diode of the switch SW102. This period is called as a dead time. At this time, in the switch SW102, a loss expressed as the product of a threshold voltage of the body diode and an inductor current Ilx is generated.

In the period E, the input voltage and the output voltage of the buffer 104 are K, while the input voltage of the inverter 103 is kept L. When the gate-source voltage of the switch SW102 exceeds the threshold voltage of the switch SW102, the switch SW102 is turned on. At this time, in the SW102, the loss expressed by the product of the on-resistance of the switch SW102 and the square of the inductor current Ilx is generated. Conversely, in the period E, the switch SW101 is kept in off state.

The length of the period D from when the switch SW101 is turned off to when the switch SW102 is turned on is controlled by the dead-time control circuit 102.

In the period F, both switches SW101 and SW102 are off. At this time, the inductor current Ilx flows through the body diode of the switch SW102. This time is called as a dead time. At this time, a loss expressed by a product of the threshold voltage of the body diode and the inductor current Ilx is generated in the switch SW102.

The loss in the periods A and C are called as "switching loss". The product of switching loss and switching frequency means an average loss. Recently, in order to compact the members used for the switching power supply device 100, a switching frequency having equal to or greater than several MHz, is used. In the switching power supply device 100 that uses high-switching frequency, the switching frequency occupies a high rate in the total loss.

In the switching power supply device 100 shown in FIG. 13, by increasing the output current of the inverter 103 to drive the switch SW101, a slew rate is increased when the voltage Vlx at the junction node Lx is increased and decreased, thereby shortening the lengths of the periods A and C, and the switching loss is suppressed. However, in general, the MOS FET has gate resistance, delay is generated by the gate resistance, and the switching loss cannot set to zero. By contrast, when the slew rate is increased, the switch SW102 is self-turned on, and the loss caused by the current penetrating through the switches SW101 and SW102 is increased. Furthermore, as the slew rate is increased, peaks of the charge currents to the parasitic capacitances Cp101, Cp102, Cp103, and Cp104 are increased.

Due to generation of self-turn on, and increase in the peak of the charge current, the electromagnetic noise is accidentally increased. The electromagnetic noise is the external disturb to the signal during communication, malfunction in peripheral devices may occur. Accordingly, in present, although the loss is increased, it is preferable that the slew rate tend to be decreased to suppress the electromagnetic noise.

As described above, in the above-described method, the switching loss and the electromagnetic noise is a trade-off relation, as the switching frequency is increased, compacting the members in the switching power supply device and the switching power supply device itself is suppressed.

SUMMARY

The present invention is conceived in view of the above-described circumstances, and provides a synchronized rectifying non-insulating switching power supply device, that can suppress switching loss and electromagnetic noise.

In one exemplary embodiment of the present disclosure, there is provided a non-insulating type switching power supply device, to convert an input voltage into a predetermined output voltage, using synchronized rectification; including an inductor, a first switch, a first control circuit, and a second control circuit. The inductor is connected to an output terminal of the device that outputs the output voltage. The first switch increases a current flowing through the inductor when turned on. The second switch decreases the current flowing through the inductor when turned on, connected to the first switch via an intermediate junction node that is connected to the inductor. The first control circuit controls the first switch, including a reference voltage source to generate a reference voltage. The second control circuit controls the second switch. While the first switch and the second switch are off, a voltage at the intermediate junction node between the first switch and the second switch is decreased when a forward current flows through the inductor, and is increased when a reverse current flows through the inductor. The first control circuit turns the first switch on when the first switch and the second switch are off and the voltage at the intermediate junction node is increased so as to decrease a voltage across the first switch to or below a first threshold voltage, turns the first switch off when a predetermined first ON-period has elapsed from when the first switch is turned on, and lengthens the first ON-period as the output voltage decreases relative to the reference voltage. The second control circuit turns the second switch on when the first switch and the second switch are off and a voltage across the second switch is decreased to or below a second threshold voltage, turns the second switch off when the second switch is on, and a reverse current flows through the inductor, sufficient to increase the voltage at the intermediate junction node so as to decrease the voltage across the first switch to or below the first threshold voltage after the second switch is turned off.

In another embodiment of the present disclosure, there is provided a non-insulating type switching power supply device to convert an input voltage into a predetermined output voltage, using synchronized rectification, including the inductor, the first switch, the second switch, a first control circuit, and a second control circuit. The first control circuit controls the first switch. The second control circuit controls the second switch, including a reference voltage source to generate a reference voltage. While the first switch and the second switch are off, a voltage at the intermediate junction node between the first switch and the second switch is decreased when a forward current flows through the inductor, and is increased when a reverse current flows through the inductor. The first control circuit turns the first switch on when the first switch and the second switch are off, and the voltage at the intermediate junction node is increased so as to decrease a voltage across the first switch to or below a first threshold voltage, and turns the first switch off when a predetermined first ON-period has elapsed from when the first switch is turned on. The second control circuit turns the second switch on when the first switch and the second switch are off and the voltage at the intermediate junction node is decreased so as to decrease a voltage across the second switch to or below a second threshold voltage, turns the second switch off when a predetermined second ON-period has elapsed from when the second switch is turned on, and lengths the second ON-period as the output voltage decreases relative to the reference voltage.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 14 is a trimming chart to illustrate the operation of the switching power supply device shown in FIG. 13.

DETAILED DESCRIPTION

Figure 1:
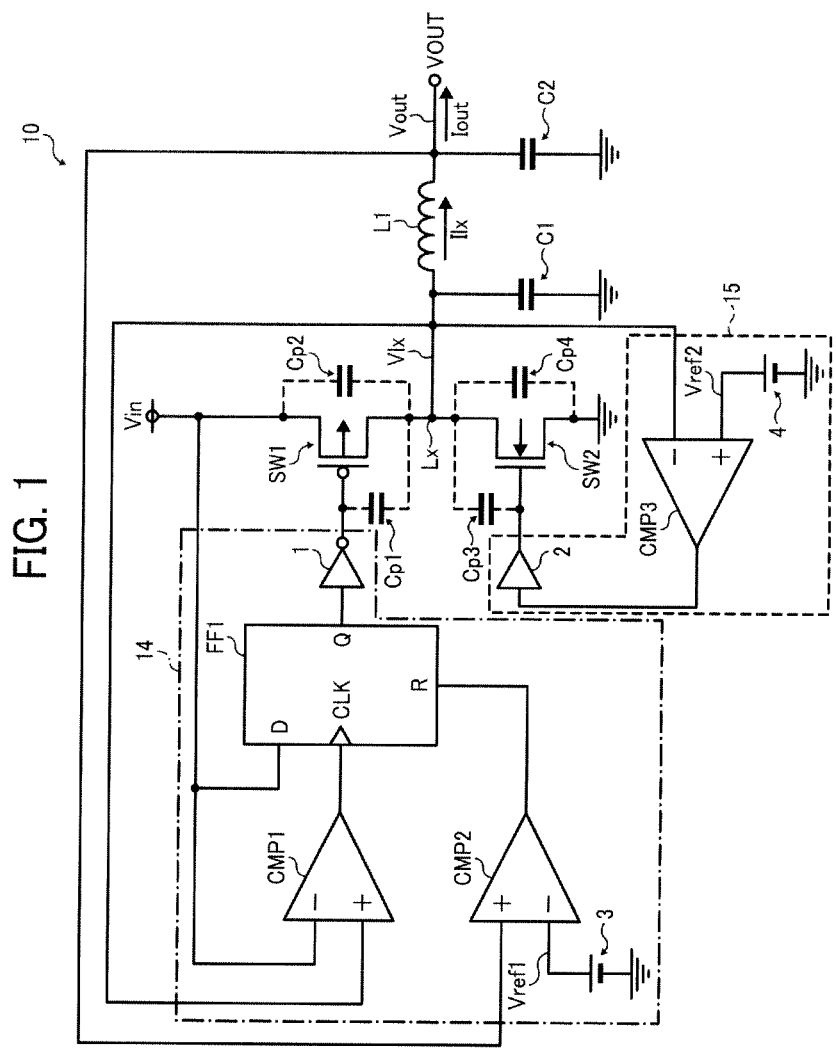
FIG. 1 is a block diagram illustrating a configuration of a switching power supply device according to a first embodiment of the present disclosure.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result. Referring now to the drawings, wherein like reference numerals designate identical or corresponding parts throughout the several views thereof, and particularly to FIG. 1, a switching power supply device of the present disclosure is described.

First Embodiment

FIG. 1 is a block diagram illustrating a configuration of a switching power supply device 10 according to a first embodiment. The switching power supply device 10 is a non-insulating step-down switching power supply device to convert an input voltage Vin into an output voltage Vout with synchronous rectification method. In FIG. 1, the switching power supply device 10 includes a high-side switch SW1 and a low-side switch SW2 directly connected between a voltage source of the input voltage Vin and a ground terminal, an inductor L1 connected between an output terminal VOUT and a junction node LX between the switches SW1 and SW2, a capacitor C1, connected to the junction node LX, that constitutes a resonant circuit with the inductor L1, and a capacitor C2 that smoothes the output voltage Vout at the output terminal VOUT. The switches SW1 and SW2 are, for example, Metal-Oxide Semiconductor Field Effect Transistor (MOSFET).

In addition, the switches SW1 and SW2 have on-resistance, and therefore, voltage differences across the switches SW1 and SW2 are generated when currents flow through the switches SW1 and SW2. In FIG. 1, reference character Iout represents an output current generated by the output terminal VOUT, Ilx represents an inductor current flowing through the inductor L1, and Vlx represents a voltage at the junction node LX. The switch SW1 increases the inductor current Ilx. On the contrary, the switch SW2 decreases the inductor current Ilx when turn on.

A parasitic capacitance Cp1 is present between and the gate and the drain of the switch SW1, and a parasitic capacitance Cp1 is between the source and the drain of the switch SW1. Similarly, a parasitic capacitance Cp3 is present between the gate and the drain of the switch SW2, and a parasitic capacitance Cp4 is present between the source and drain of the switch SW2. In a state in which both switches SW1 and SW2 are off, the voltage Vlx at the junction node LX is decreased when a forward current flows through the inductor L1, and is increased when a reverse current flows through the inductor L1.

In addition, the switching power supply device 10 includes a first control circuit 14 to control the switch SW1 and a second control circuit 15 to control the switch SW2.

In the first embodiment, the first control circuit 14 for the switch SW1 includes a reference voltage source 3, comparators CMP1 and CMP2, a flip-flop FF1, and an inverter 1. The reference voltage source 3 generates a reference voltage Vref1 corresponding to a desired output voltage Vout. The input voltage Vin is input to an inverting input terminal (−) of the comparator CMP1, and a voltage Vlx at the junction node LX is input to an non-inverting input terminal (+) of the comparator CMP1. The output signal of the comparator CMP1 is input to a clock terminal (CLK) of the flip-flop FF1. The reference voltage Vref1 is input to an inverting input terminal (−) of the comparator CMP2 and the output voltage Vout is input to a non-inverting input terminal (+) of the comparator CMP2. An output signal of the comparator CMP2 is connected to a reset terminal (R) of the flip-flop FF1. An output signal (Q) of the flip-flop FF1 is input to the inverter 1, and an output voltage of the inverter 1 is input to the gate of the switch SW1.

When the switches SW1 and SW2 are off, and the voltage Vlx at the junction node LX are increased so that the source-drain voltage of the switch SW2 falls below a first threshold voltage (for example, 0), the first control circuit 14 turns the switch SW1 on. In the switching power supply device 10 shown in FIG. 1, when the voltage Vlx at the junction node Lx exceeds the input voltage Vin, the switch SW1 is turned on. In addition, the first control circuit 14 turns the switch SW1 off when a first ON-period has elapsed from when the switch SW1 is turned on. The first ON-period is lengthened as the output voltage Vout decreases relative to than the reference voltage Vref1. The switch SW1 is turned on and off when the source-drain voltage of the switch SW1 is small, which can achieve a zero volt switching (ZVS).

The second control circuit 15 for the switch SW2 includes a reference voltage source 4, a comparator CMP3, and a buffer 2. When the switch SW1 is off and the switch SW2 is on, the reference voltage source 4 generates a reference voltage Vref2 corresponding to a source-drain voltage of the switch SW2 generated by flowing a predetermined reverse current to an inductor L1. More specifically, the reference voltage Vref2 corresponds to the source-drain voltage of the switch SW2 generated by flowing the inductor current Ilx through the inductor L1 when a reverse current flows through the inductor L1, sufficient to increase the voltage Vlx at the junction node LX so as to decrease the source-drain voltage of the switch SW1 to or below the first threshold voltage (until the voltage Vlx at the junction node LX exceeds the input voltage Vin) after the switch SW2 is turned off. In addition, the reference voltage Vref2 corresponds to the source-drain voltage of the switch SW2 when the zero-volt switching of the switch SW2 can be actually performed. The voltage Vlx at the junction node LX is input to an inverting input terminal (−) of the comparator CMP3, and the reference voltage Vref2 is input to a non-inverting input terminal (+) of the comparator CMP3. An output signal of the comparator CMP3 is input to the buffer 2, and an output signal of the buffer 2 is applied to the gate of the switch SW2.

The second control circuit 15 turns the switch SW2 on, when the switches SW1 and SW2 are off, and the voltage Vlx at the junction node LX is decreased so as to decrease the source-drain voltage of the switch SW2 to or below the reference voltage Vref2 (second threshold value). In addition, the second control circuit 15 turns the second switch SW2 off, when the switch SW2 is on, and a reverse current flows through the inductor L1, sufficient to increase the voltage Vlx at the junction node LX to decrease the source-drain voltage of the switch SW1 to or below the first threshold value after the switch SW2 is turned off. The switch SW2 is turned on and off when the source-drain voltage is small, which can achieve zero-volt switching (ZVS).

Figure 2:
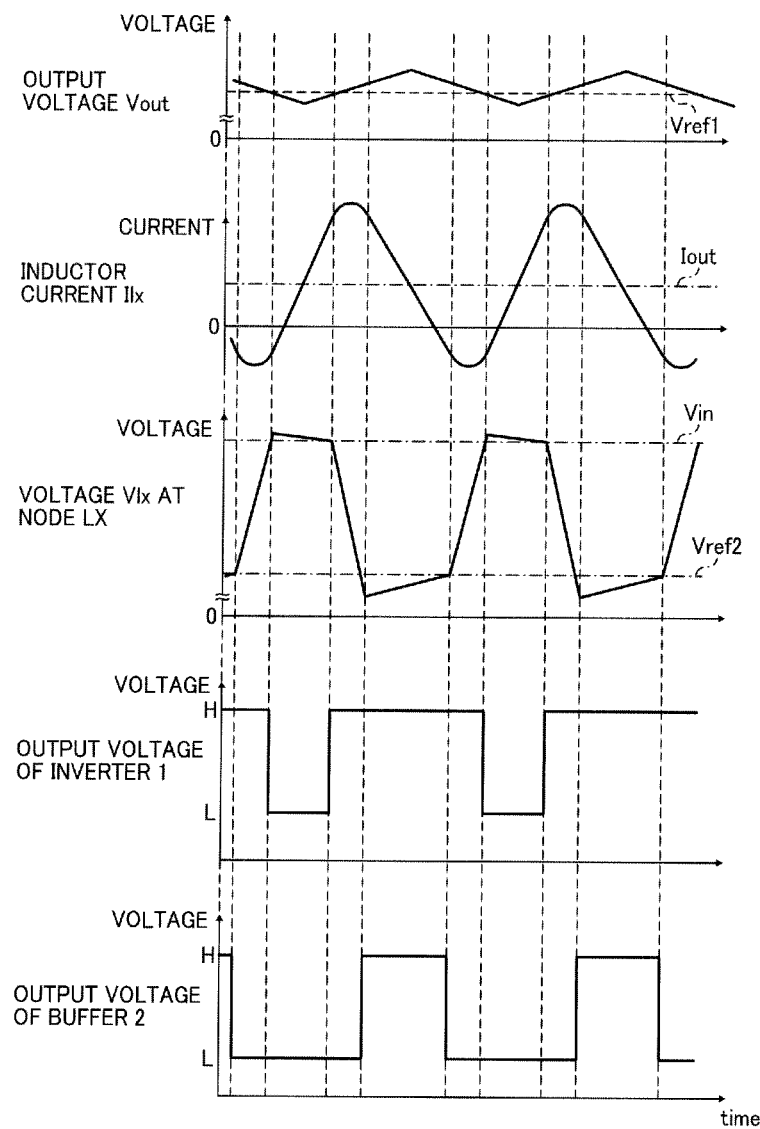
FIG. 2 is a timing chart illustrating operation of the switching power supply device shown in FIG. 1.

FIG. 2 is a timing chart illustrating operation of the switching power supply device 10 shown in FIG. 1. In FIG. 2, the voltage Vlx at the junction node LX has a predetermined gradient caused by the inductor current Ilx and the on-resistance of the switches SW1 and SW2 when the voltage Vlx is in a high state (H) and in a low state (L). Actually, since the on-resistances of the switches SW1 and SW2 are very small, the gradient of the voltage Vlx at the junction node LX is very small, but for the description, the gradient is emphatically illustrated in FIG. 2.

With reference to FIG. 2, the timing at which the output voltage of the inverter 1 is changed from high to low is described below. When the voltage Vlx at the junction node LX exceeds the input voltage Vin, the output signal of the comparator CMP1 is changed to H, the output signal of the flip-flop FF1 is changed to H, and the output voltage of the inverter 1 is changed to L. When the output voltage of the inverter 1 is changed to L, the switch SW1 is turned on, and the current flows from the voltage source of the input voltage Vin to the inductor L1 via the switch SW1. The first control circuit 14 maintains the switch SW1 in on state for the predetermined first ON-period from when the switch SW1 is turned on.

The first ON-period of the switch SW1 is a time period from when the switch SW1 is turned on to when the output voltage Vout is increased to exceed the reference voltage Vref1. When the inductor current Ilx exceeds the output current Iout, the output voltage Vout is started increasing. When the output voltage Vout exceeds the reference voltage Vref1, the output signal of the comparator CMP2 is changed to H, the output signal of the flip-flop FF1 is changed to L, and the output voltage of the inverter 1 is changed to H. When the output voltage of the inverter 1 is changed to H, the switch SW1 is turned off. When the switch SW1 is turned off, the inductor current Ilx decreases the voltage Vlx at the junction node Lx. At this time, a slew rate of the voltage Vlx at the junction node LX is decreased by the capacitor C1, the current flowing through the parasitic capacitance Cp1 between the drain and gate of the switch SW1 is small.

As long as the current output from the inverter 1 to drive the switch SW1 is greater than the current flowing through the parasitic capacitance Cp1, the gate-source voltage of the switch SW1 never exceed the threshold voltage of the switch SW1 due to the current flowing through the parasitic capacitance Cp1. Accordingly, while the voltage Vlx at the junction node Lx is transited, the switch SW1 is completely off. That is, the switching loss does not generate in the switch SW1.

When the voltage Vlx at the junction node LX is decreased to fall below the reference voltage Vref2, the output signal of the comparator CMP3 is changed to high, and the output voltage of the buffer 2 is changed to high. When the output voltage of the buffer 2 is changed to H, the switch SW2 is turned on and the current flows from the ground terminal to the inductor L1 via the switch SW2. By flowing the inductor current Ilx through the switch SW2 having the on-resistance, the voltage Vlx at the junction node LX is gradually increased.

When the voltage Vlx at the junction node LX exceeds the reference voltage Vref2, the output signal of the comparator CMP3 is changed to L, and the output voltage of the buffer 2 is changed to L. When the output voltage of the buffer 2 is changed to L, the switch SW2 is turned off. When the switch SW2 is turned off, the inductor current Ilx increases the voltage Vlx at the junction node LX. At this time, since the slew-rate of the voltage Vlx at the junction node LX is decreased by the capacitor C1, the current flowing through the parasitic capacitor Cp3 between the drain and the gate of the switch SW2 is small. As long as the current output from the buffer 2 to drive the switch SW2 is greater than the current flowing through the parasitic capacitor Cp3, the gate-source voltage of the switch SW2 never exceed the threshold voltage of the switch SW2 due to the current flowing through the parasitic capacitors Cp3. Accordingly, while the voltage Vlx at the junction node LX is transited, the switch SW2 is completely off. That is, the self-turn on function in the switch SW2 does not activate, and the switching loss is not generated in the switch SW2.

Figure 3:
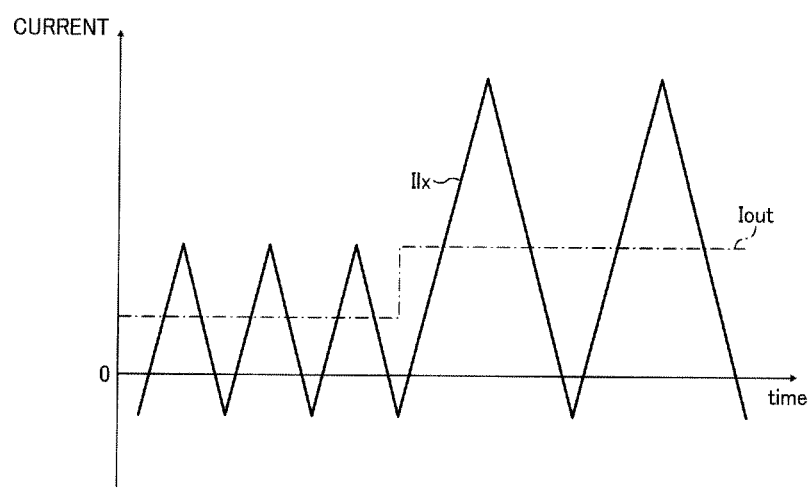
FIG. 3 is a diagram illustrating an inductor current Ilx and an output current Iout in the switching power supply device shown in FIG. 1.

FIG. 3 is a diagram illustrating the inductor current Ilx and the output current Iout in the switching power supply device 10 shown in FIG. 1. More specifically, FIG. 3 illustrates the inductor current Ilx and the output current Iout when a consumption current of a load connected to the output terminal VOUT shown in FIG. 1 fluctuates. A lower limit of the inductor current Ilx is determined based on the reference voltage Vref2 by the comparator CMP3, the lower limit is always kept at the same value. Accordingly, it is necessary to control to increase a peak of the inductor current Ilx so that the switching power supply device 10 can track the increase in the consumption current of the load.

Noted that, since the gradient of the inductor Ilx is kept constant, when the peak of the inductor current Ilx is increased, the frequency value in which the inductor current Ilx fluctuates is decreased. Conversely, when the peak of the inductor current Ilx is decreased, the frequency value in which the inductor current Ilx fluctuates is increased. This control method is called as a Pulse Frequency Modulation (PFM) control, which can realize the simple configuration.

In the above-described switching power supply device 10 shown in FIG. 1, the switching loss is not generated, and only the loss expressed by the product of the on-resistances of the switches SW1 and SW2 and the square of the currents flowing through the switches SW1 and SW2 is generated. With this setting, even when the switching frequency is increased, the loss is not generated. Therefore, the switching power supply device 10 shown in FIG. 1 can operate at a very high switching frequency. In addition, rapid charging to the parasitic capacitors Cp1 to Cp4 of the switches SW1 and SW2 does not operate, and the electromagnetic noise can be suppressed at a very low level.

As described above, in the switching power supply device 10 shown in FIG. 1, synchronized rectification type and non-insulating type switching power supply device 10 can suppress both the switching loss and electromagnetic noise.

Noted that, when the current output from the inverters 1 and 2 to drive the switches SW1 and SW2 are sufficiently great, when the gate-resistances of the switches SW1 and SW2 are small, and when the voltage Vlx at the junction node Lx is transited, both the switches SW1 and SW2 are completely kept in off state. Accordingly, there is little doubt that the gate-source voltages of the switches SW1 and SW2 be kept near the threshold voltage of the switches SW1 and SW2 and the switches SW1 and SW2 be self-turn on, the capacitor C1 can be eliminated. Further, when the parasitic capacitors Cp1 and Cp4 between the drains and the sources of the switches SW1 and SW2 are great, this configuration has similar effect to the capacitor C1, and the capacitor C1 may be eliminated.

Figure 1A:
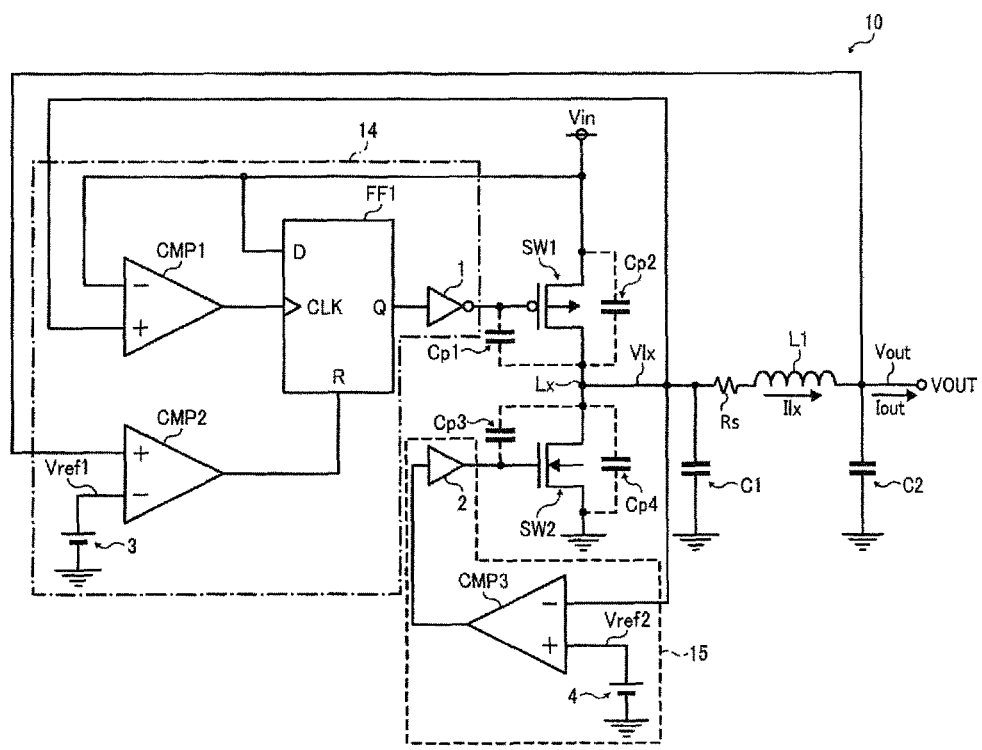
FIG. 1A shows a configuration of a switching power supply device according to a variation of the embodiment shown in FIG. 1.

Further, in the switching power supply device 10 shown in FIG. 1, the second control circuit 15 for the switch SW2 detects the magnitude of the reverse current of the inductor L1, by detecting the source-drain voltage of the switch SW2 generated by the on-resistance of the switch SW2. Alternatively, the switching power supply device 10 further may include a sensor resistor Rs connected in series to the inductor L1, shown in FIG. 1A, by detecting the voltage across the sensor resistor, the magnitude of the reverse current of the inductor may be detected.

Yet alternatively, the output voltage Vout may be divided before the output voltage Vout is input to the non-inverting input terminal of the comparator CMP2. In the voltages input to the comparator CMP2, the reference voltage Vref1 is a fixed value, but the output voltage Vout may be divided a feedback resistor to have a voltage value determined by user settings.

(First Variation of First Embodiment)

Figure 4:
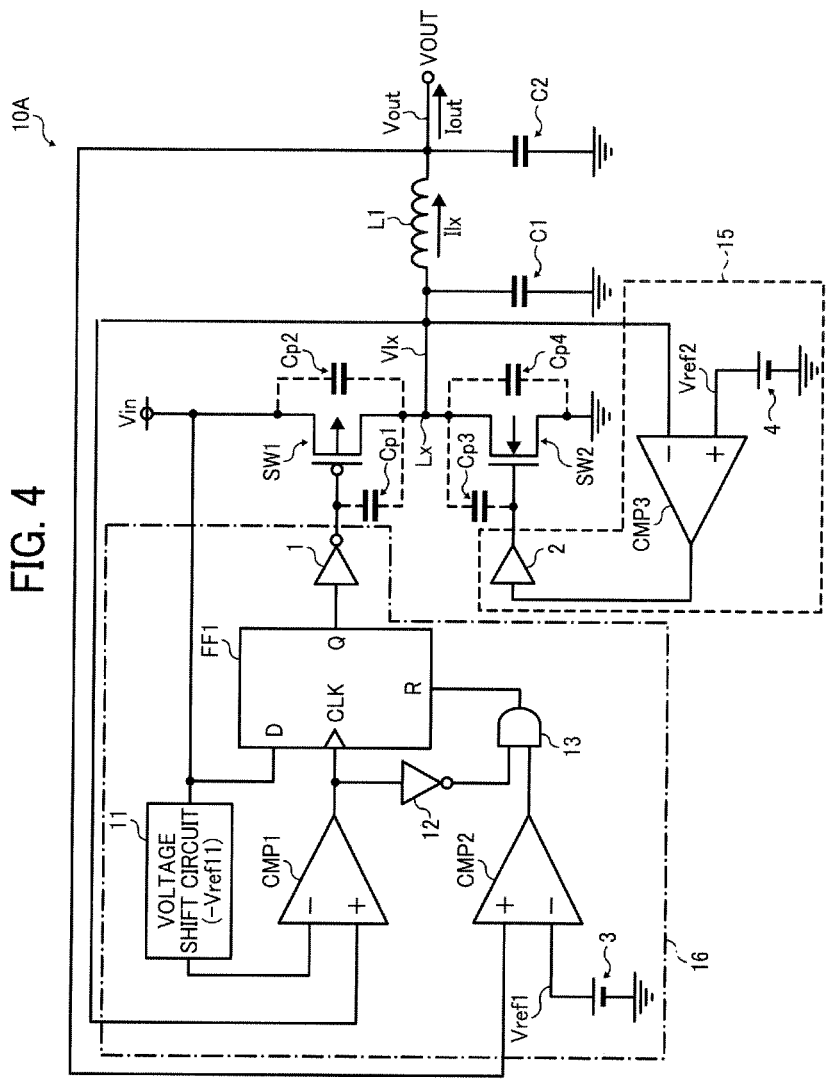
FIG. 4 is a block diagram illustrating a configuration of a switching power supply device according to a variation of the first embodiment.

FIG. 4 is a block diagram illustrating a configuration of a switching power supply device 10A according to a first variation of the first embodiment. In the switching power supply device 10A shown in FIG. 4, a first control circuit 16 for the switch SW1 includes a voltage-shift circuit 11, an inverter 12, and an AND circuit 13, instead of the elements in the first control circuit 14 shown in FIG. 1. The voltage-shift circuit 11 subtracts a reference voltage Vref11 from the input voltage Vin and the decreased voltage is input to the non-inverting input terminal of the comparator CMP1. The reference voltage Vref11 corresponds to the source-drain voltage of the switch SW1 generated by flowing a predetermined forward current to the inductor L1 when the switch SW1 is off and the switch SW2 is on. More specifically, the reference voltage Vref11 corresponds to the source-drain voltage of the switch SW1 generated by flowing the inductor current Ilx through the inductor L1, when a forward current flows through the inductor L1, sufficient to decrease the voltage Vlx at the junction node LX until the source-drain voltage of the switch SW2 is decreased to or below the second threshold value of the switch SW2 (that is, the voltage Vlx at the junction node LX falls below the reference voltage Vref2) after the switch SW1 is turned off. In addition, the reference voltage Vref11 corresponds to the source-drain voltage of the switch SW1 when zero-volt switching of the switch SW1 can be actually performed. The output signal of the comparator CMP2 is input to one terminal of the AND circuit 13, and the output signal from the comparator CMP1 is input to the other input terminal of the AND circuit 13 via the inverter 12. The output signal of the AND circuit 13 is input to a reset terminal of the flip-flop circuit FF1.

Other elements of the switching power supply device 10A shown in FIG. 4 are configured similar to the switching power supply device 10 shown in FIG. 1.

In the first control circuit 16 for the switch SW1, the switch SW1 is turned on when the both switches SW1 and SW2 are off and the voltage Vlx at the junction node LX is increased so as to decrease the source-drain voltage of the switch SW1 to or below the first threshold voltage Vref1. In the switching power supply device 10A, when the voltage Vlx at the junction node LX exceeds the voltage "Vin-Vref11". In addition, in the first control circuit 16 for the switch SW1, the switch SW1 is turned off, when the switch SW is on, the output voltage Vout is increased to exceed the reference voltage Vref1, and a forward current flows through the inductor L1, sufficient to decrease the voltage Vlx at the junction node LX so as to decrease the source-drain voltage of the switch SW2 to or below the second threshold voltage after the switch SW1 is turned off. The switch SW is turned on and off when the source-drain voltage is small, which can achieve zero-volt switching.

In the switching power supply device 10A shown in FIG. 4, the second control circuit 15 for the switch SW2 operates similar to the second control circuit 15 for the switch SW2 shown in FIG. 1

In the switching power supply device 10A shown in FIG. 4, the synchronized rectifying non-insulating type switching power supply device 10A can suppress the switching loss and electromagnetic noise. In addition, in the switching power supply device 10A shown in FIG. 4, by detecting the forward current of the inductor L1, after the switch SW1 is turned off, zero-volt switching can be surely achieved. Therefore, malfunction of the switches SW1 and SW2 (for example, the switch SW2 is not turned on after the switch SW1 is turned on) can be prevented.

Figure 4A:
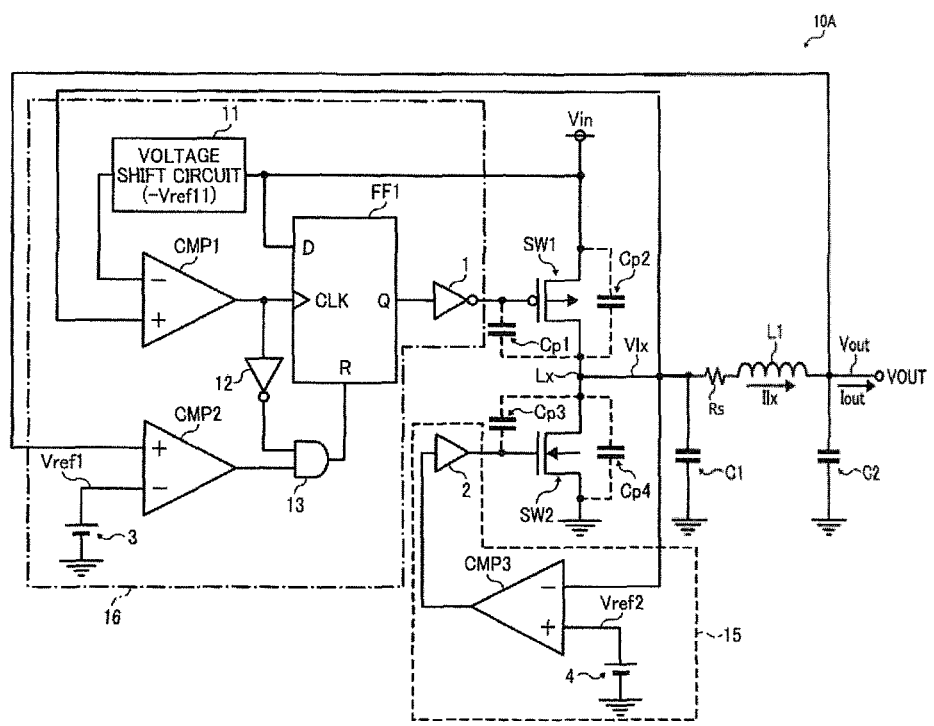
FIG. 4A shows a configuration of a switching power supply device according to a variation of the embodiment shown in FIG. 4.

In the switching power supply device 10A shown in FIG. 4, by detecting the source-drain voltage of the switch SW1 generated by the on-resistance of the switch SW1, the first control circuit 16 detects the magnitude of the forward current of the inductor L1. Alternatively, the switching power supply device 10A further includes a sense resistor Rs connected in series to the inductor L1, shown in FIG. 4A, and the forward current of the inductor L1 may be detected by detecting a voltage across the sensor resistor.

In addition, in the switching power supply device 10A shown in FIG. 4, the comparator CMP1 may set an offset voltage equal to the reference voltage Vref11, instead of providing the voltage-shift circuit 11.

(Second Variation of First Embodiment)

Figure 5:
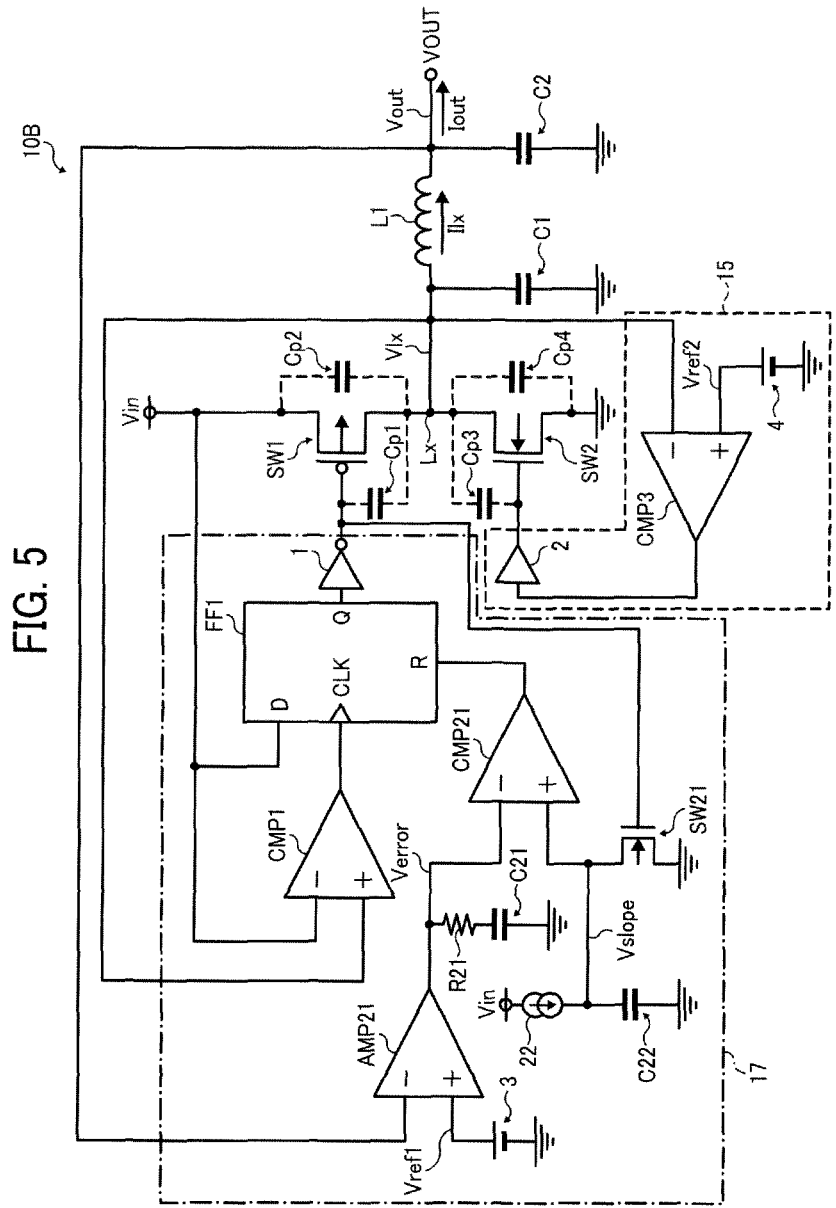
FIG. 5 is a block diagram illustrating a configuration of a switching power supply device according a second variation of the first embodiment.

FIG. 5 is a block diagram illustrating a switching power supply device 10B according a second variation of the first embodiment. In the switching power supply device 10 shown in FIG. 1, in order to determine the ON-period of the switch SW1, the comparator CMP2 directly compares the output voltage Vout and the reference voltage Vref1. Therefore, it is necessary that the output voltage Vout contain a certain degree of ripples. When the switching frequency is increased, the ripple of the output voltage Vout is decreased, thus causing the switching power supply device 10 to malfunction.

In the switching power supply device 10B shown in FIG. 5, a first control circuit 17 for the switch SW1 is configured similar to the first control circuit 14 for the switch SW1 shown in FIG. 1, except the following characteristics. In addition, the first control circuit 17 shown in FIG. 5 includes an error amplifier AMP21, a comparator CMP21, a switch 22, a resistor 1221, capacitors C21 and C22, and a constant current source 22. The reference voltage Vref1 is input to a non-inverting input terminal (+) of the error amplifier AMP21, the output voltage Vout is input to an inverting input terminal (−) of the error amplifier AMP21. An output terminal of the error amplifier AMP21 is connected to the ground via the resistor R21 and the capacitor C21. The resistor R21 and the capacitor C21 function as a phase compensation circuit. The output signal from the error amplifier AMP21 is input to the inverting input terminal of the comparator CMP21 as an error voltage Verror between the reference voltage Vref1 and the output voltage Vout. In addition, the output signal of the error amplifier AMP21 may be amplified by a trans-conductance amplifier. Further, the constant current source 22 is connected to the ground via the capacitor C22. The junction node between the constant current source 22 and the capacitor C22 is connected to the ground via the switch SW21 and is connected to the non-inverting input terminal (+) of the comparator CMP21. The output voltage of the inverter 1 is input to the gate of the switch SW21. The switch SW21 is turned on when the output voltage of the inverter 1 is high, and is turned off when the output voltage of the inverter 1 is low.

At the junction node between the constant current source 22 and the capacitor C22, a slope voltage Vslope having a triangular wave or a rectangular wave is generated. The output signal of the comparator CMP21 is input to a reset terminal of the flip-flop FF1. In the switching power supply device 10B shown in FIG. 5, the first control circuit 17 for the switch SW1 determines the ON-period of the switch SW1 based on the error voltage Verror and the slope voltage Vslope. The first ON-period of the switch SW1 is a time period from when the switch SW1 is turned on to charge the capacitor C22 to when the voltage across the capacitor C22 (slope voltage Vslope) reaches the error voltage Verror.

The other elements in the switching power supply device 10B shown in FIG. 5 are configured similar to the switching power supply device 10B shown in FIG. 1.

Figure 6:
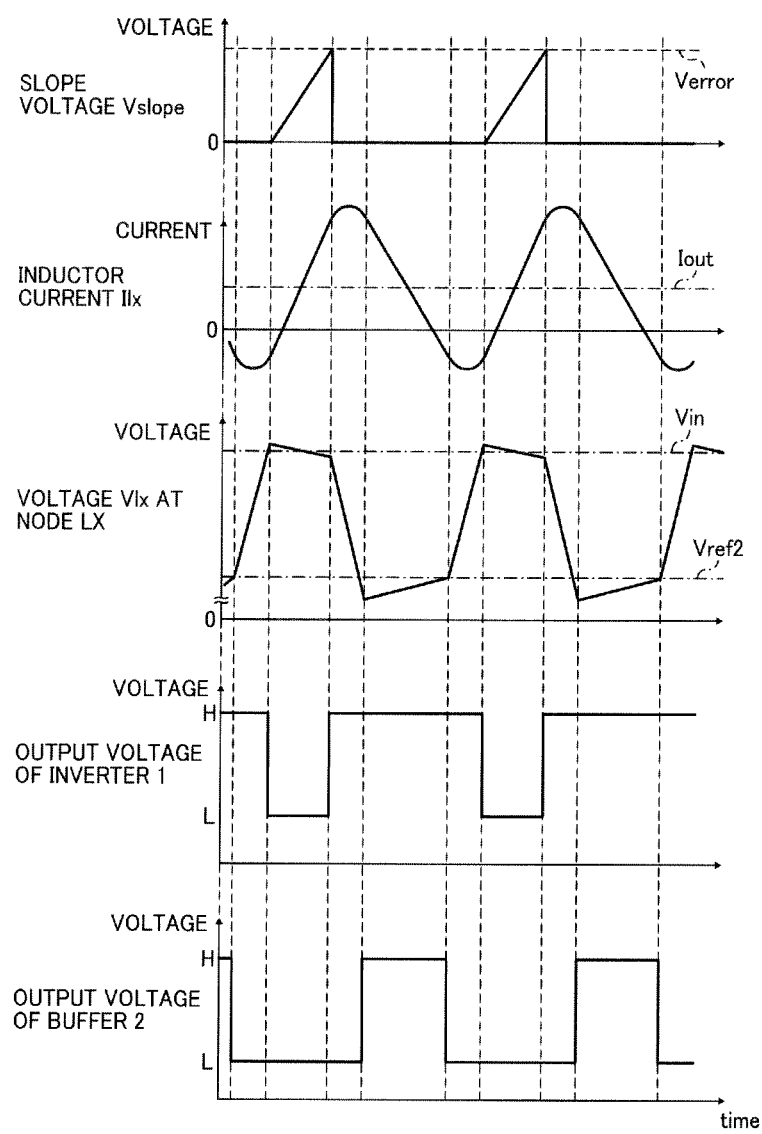
FIG. 6 is a timing chart illustrating operation of the switching power supply device shown in FIG. 5.

FIG. 6 is a timing chart illustrating operation of the switching power supply device 10B shown in FIG. 5. When the voltage Vlx at the junction node LX exceeds the input voltage Vin, the output signal of the comparator CMP1 is changed to high, the output signal of the flip-flop FF1 is changed to H, and the output voltage of the inverter 1 is changed to L, and the switch SW1 is turned on. In addition, when the output voltage of the inverter 1 is changed to L, the switch SW21 is turned off, the constant-current source 22 charges the electrical charge in the capacitor C22, and the slope voltage Vslope is increased. When the slope voltage Vslope exceeds the error voltage Verror, the output signal of the compactor CMP21 is changed to high, the output signal of the flip-flop FF1 is changed to L, the output voltage of the inverter 1 is changed to H, and the switch SW1 is turned off. When the output voltage of the inverted is changed to L, the switch SW21 is turned on, and the slope voltage Vslope is decreased to the ground voltage.

The error voltage Verror is increased when the output voltage Vout falls below the reference voltage Vref1, and is decreased when the output voltage Vout exceeds the reference voltage Vref1. The first ON-period of the switch SW1 is lengthened when the error voltage Verror is increased, and is shortened when the error voltage Verror is decreased.

In the switching power supply device 10B shown in FIG. 5, the synchronized rectification and non-insulating switching power supply device 10B can suppress the switching loss and the electromagnetic noise. In addition, in the switching power supply device 10B shown in FIG. 5, by determining the ON-period of the switch SW1 based on the error voltage Verror and the slope voltage Vslope, without depending on the ripple of the output voltage Vout, the average of the output voltage Vout can track the reference voltage Vref1.

Second Embodiment

Figure 7:
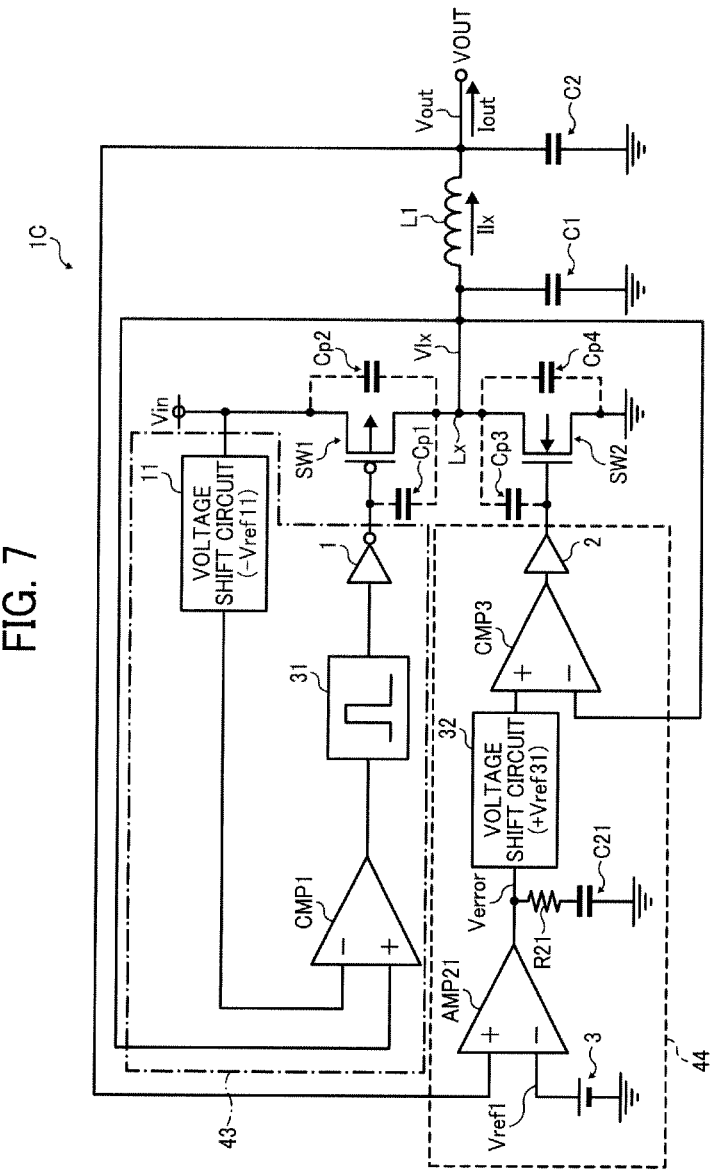
FIG. 7 is a block diagram illustrating a configuration of a switching power supply device according to a second embodiment of the present disclosure.

FIG. 7 is a block diagram illustrating a configuration of a switching power supply device 10C according to a second embodiment. In the switching power supply device 10 according to the first embodiment, using PFM control, the switching frequency fluctuates. By contrast, in the switching power supply device 10C according to the second embodiment, in order to keep the switching frequency at a constant value, the length of ON-period of the switch SW1 is kept and is controlled so that the lower limit of the inductor current Ilx fluctuates. Under an ideal condition in which the on-resistances of the switches SW1 and SW2 are zero, when the input voltage Vin and the output voltage Vout are determined, the duty ratio is determined. Accordingly, if the ON-period of the switch SW1 is constant, an OFF-period of the switch SW1 is constant. That is, in the switching power supply device 10C according to the second embodiment, by setting the length of 1 cycle of the operation of the switching power supply device 10C, the switching frequency can be kept constant.

In the switching power supply device 10C shown in FIG. 7, a first control circuit 43 for the switch SW1 includes the voltage-shift circuit 11, the comparator CMP1, a pulse generation circuit 31, and the inverter 1. The voltage shift circuit 11, the comparator CMP1, and the inverter 1 shown in FIG. 7 are configured similar to the elements in the switching power supply devices 10 and 10A shown in FIGS. 1 and 4. The output signal of the comparator CMP1 is input to the pulse generator circuit 31, the output signal of the pulse generator circuit 31 is input to the inverter 1. When the output signal of the comparator CMP1 is changed to H, the pulse generator circuit 31 sets the output signal to H for a predetermined first ON-period.

The first control circuit 43 turns the switch SW1 on while the switches SW1 and SW2 are off and when the voltage Vlx at the junction node LX is increased so as to decrease the source-drain voltage of the switch SW1 to or below the first threshold value (e.g., Vref11). In addition, the first control circuit 43 turns the switch SW1 off when the predetermined first ON-period has elapsed from when the switch SW1 is turned on. The switch SW1 is turned on and off when the source-drain voltage thereof is small, which can achieve zero-volt switching.

Figure 7A:
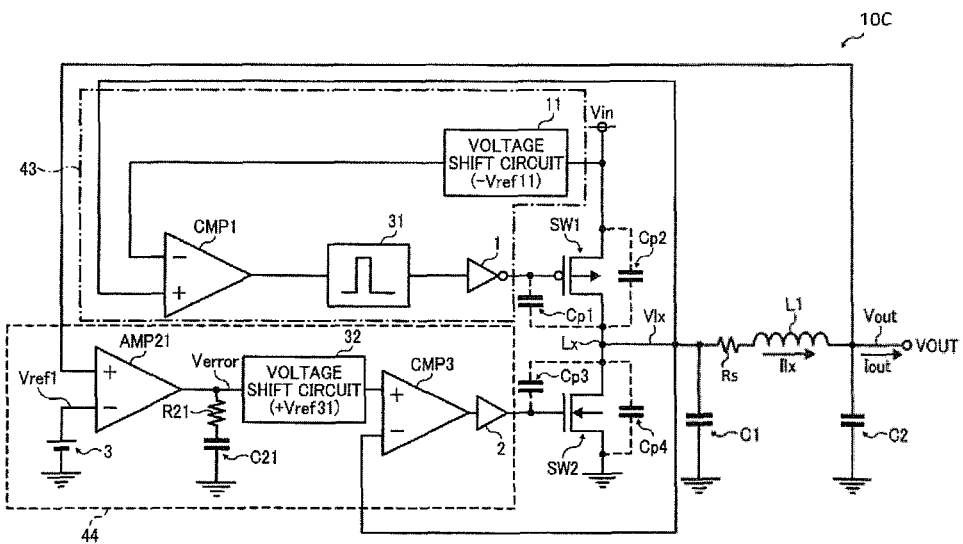
FIG. 7A shows a configuration of a switching power supply device according to a variation of the embodiment shown in FIG. 7.

Further, in the switching power supply device 10C shown in FIG. 7, the second control circuit 44 for the switch SW2 detects the magnitude of the reverse current of the inductor L1 by detecting the source-drain voltage of the switch SW2 generated by the on-resistance of the switch SW2. Alternatively, the switching power supply device 10C may further includes a sense resistor Rs connected in series to the inductor L1, shown in FIG. 7A, and the magnitude of the reverse current of the inductor L1 may be detected by detecting a voltage across the sensor resistor.

The voltage-shift circuit 32 adds the reference voltage Vref31 to the error voltage Verror for outputting the increased voltage to a non-inverting input terminal (+) of the comparator CMP3. The sum of the error voltage Verror and the reference voltage Vref31 corresponds the source-drain voltage of the switch SW2 generated by flowing a predetermined reverse current to the inductor L1 when the switch SW1 is off and the switch SW2 is on. More specifically, the sum of the error voltage Verror and the reference voltage Cref31 corresponds to the source-drain voltage of the switch SW2 generated by flowing a predetermined reverse current to the inductor L1 when a reverse current flows through the inductor, sufficient to increase the voltage Vlx at the junction node LX so as to decrease the source-drain voltage of the switch SW1 to or below the first threshold value (e.g., Vref11) after the witch SW1 is turned off. Further, the sum of the error voltage Verror and the reference voltage Vref3 corresponds to the source-drain voltage of the switch SW2 when zero-volt switching of the switch SW2 is actually performed.

The second control circuit 44 turns the switch SW2 on when both switches SW1 and SW2 are off and the voltage Vlx at the junction node LX is decreased so that the source-drain voltage of the switch SW2 falls below a second threshold voltage (the sum of the error voltage Verror and the reference voltage Vref31). The second control circuit 44 turns the switch SW2 off when a second ON-period has elapsed from when the switch SW2 is turned on. The second ON-period is shortened as the output voltage Vout decreases relative to the reference voltage Vref1. The switch SW2 is turned on and off when the source-drain voltage of the switch SW2 is small, which can achieve zero-volt switching.

The second control circuit 44 may turn the switch SW2 off when the second ON-period has elapsed from when the switch SW2 is on, and a reverse current flows through the inductor L1, sufficient to increase the voltage Vlx at the junction node LX so as to decrease the source-drain voltage of the switch SW1 to or below the first threshold value (e.g., Vref11) after the switch SW2 is turned off.

Figure 8:
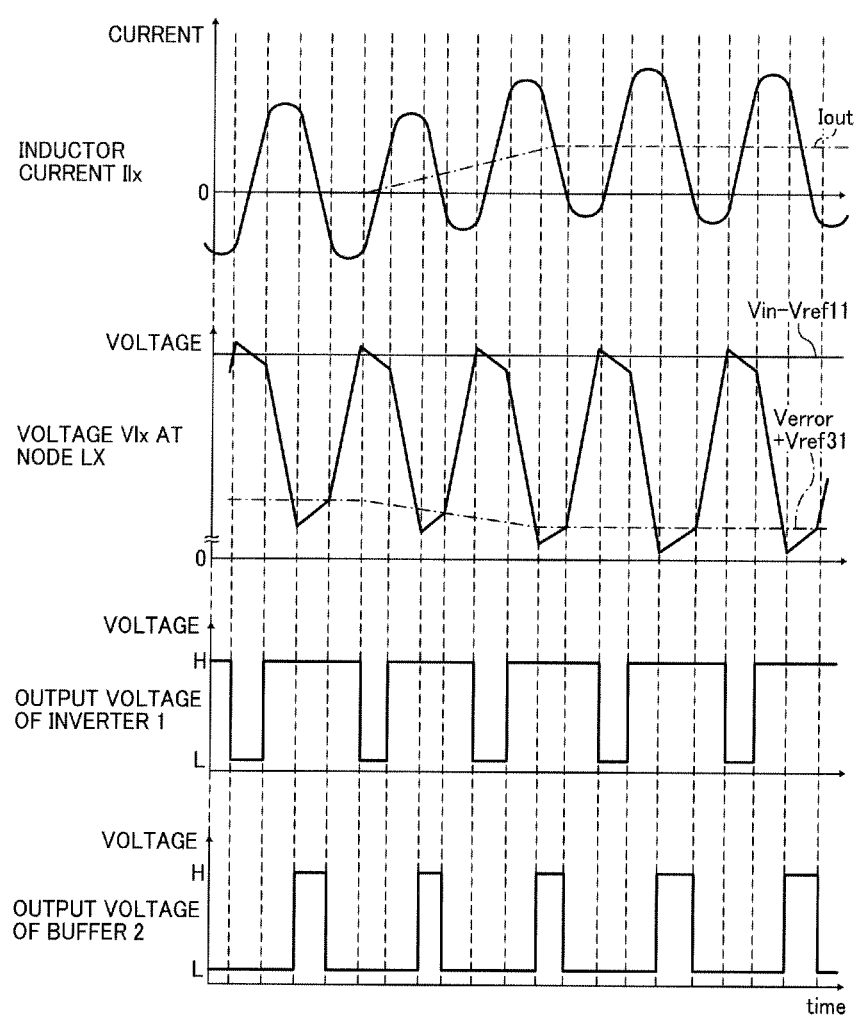
FIG. 8 is a timing chart illustrating operation of the switching power supply device shown in FIG. 7.

FIG. 8 is a timing chart illustrating the operation of the switching power supply device 10C shown in FIG. 7. When the voltage Vlx at the junction node LX exceeds the voltage "Vin–Vref11", the output signal of the comparator CMP1 is changed to high, an output signal of the pulse generation circuit 31 is high for the predetermined first ON-period, and the switch SW1 is on for the first ON-period. When the first ON-period has elapsed, the output signal of the pulse generator circuit 31 is low, and the switch SW1 is turned off. When the switch SW1 is turned off, the inductor current Ilx decreases the voltage Vlx at the junction node LX. When the voltage VLx at the junction node LX falls below the sum of the error voltage Verror and the reference voltage Vref31, the output signal of the comparator CMP3 is changed to H, and the switch SW2 is turned on. When the switch SW2 is turned on and the voltage Vlx at the junction node LX exceeds the sum of the error voltage Verror and the reference voltage Vref31, the output signal of the comparator CMP3 is changed to L, and the switch SW2 is turned off. When the switch SW2 is turned off, the inductor current Ilx increases the voltage Vlx at the junction node LX. When the voltage Vlx at the junction node LX exceeds the voltage "Vin–Vref11", the switch SW1 is turned on again.

When the output signal Iout is increased, the output voltage Vout is decreased, and the error voltage Verror is decreased. When the error voltage Verror is decreased, the sum of the error voltage Verror and the reference voltage Vref31 is decreased, as a result, the reverse current of the inductor L1 is decreased. As described above, by decreasing the reverse current of the inductor L1, the inductor current Ilx can follow the output current Iout.

Noted that, when the state in which the inductor current Ilx follows the output current Iout is transited, the length of the ON-period of the switch SW2 fluctuates, and therefore, the switching frequency fluctuates.

In the switching power supply device 10C shown in FIG. 7, the synchronized rectification and non-insulating type switching power supply device 10C can suppress the switching loss and the electromagnetic noise. In addition, since the switch SW1 has the predetermined ON-period, and the switching power supply device 10C shown in FIG. 7 can operate at a constant switching frequency.

Further, in the switching power supply device 10C shown in FIG. 7, the second control circuit 44 for the switch SW2 detects the magnitude of the reverse current of the inductor L1 by detecting the source-drain voltage of the switch SW2 generated by the on-resistance of the switch SW2. Alternatively, the switching power supply device 10C may further includes a sense resistor connected in series to the inductor L1, and the magnitude of the reverse current of the inductor L1 may be detected by detecting a voltage across the sensor resistor.

Yet alternatively, in the switching power supply device 10C shown in FIG. 7, the comparator CMP3 may set an offset voltage equal to the reference voltage Vref31, instead of providing the voltage-shift circuit 32. Yet alternatively, since the reference voltage Vref31 is used to assure the minimum voltage of the non-inverting input signal of the comparator CMP3, the error voltage Verror may be clamped at the reference voltage Vref31.

(First Variation of Second Embodiment)

Figure 9:
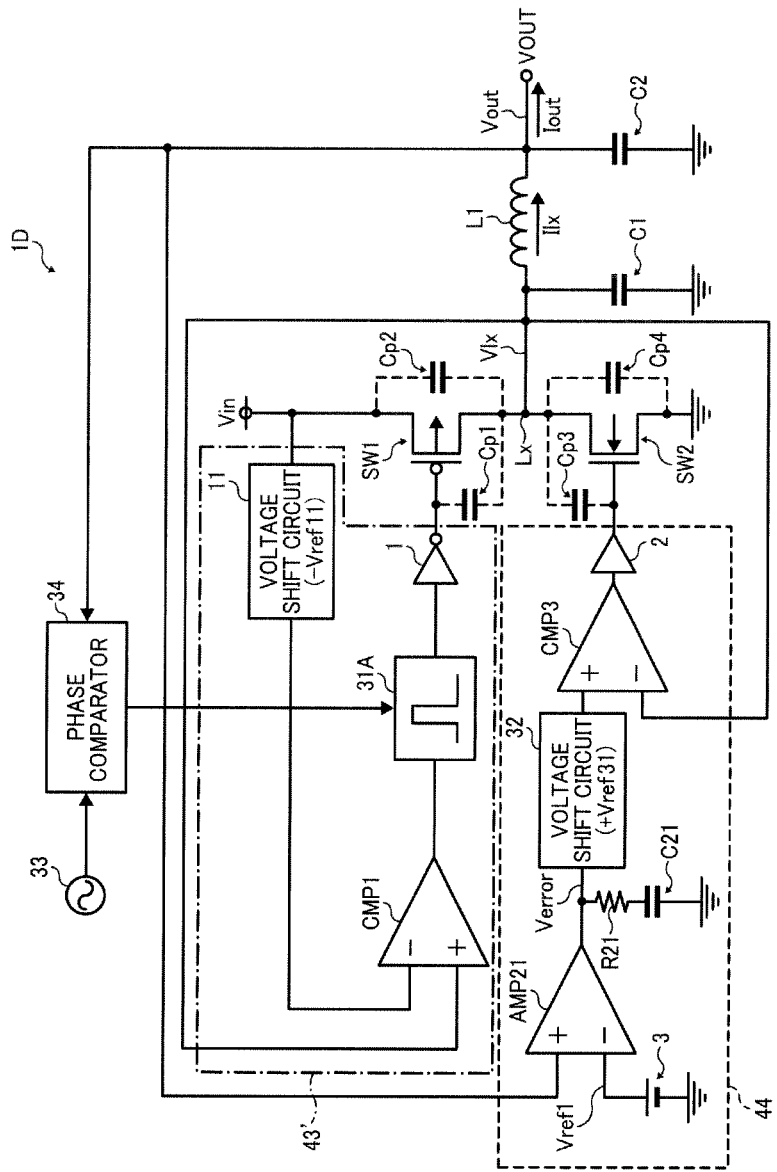
FIG. 9 is a block diagram illustrating a configuration of a switching power supply device according to a first variation of the second embodiment.

FIG. 9 is a block diagram illustrating a configuration of a switching power supply device 10D according to a first variation of the second embodiment. Similarly to the above-described configurations, the input voltage Vin and the output voltage Vout have predetermined values. If the on-resistance is zero, the switching frequency is set at constant, in actual, the input voltage Vin and the output voltage Vout fluctuates, and the on-resistance is not zero. Therefore, depending on the fluctuation in the input voltage Vin and Vout, or depending on the fluctuation in the consumption current of the load, the switching frequency fluctuates.

In FIG. 9, in addition to the configuration of the switching power supply device 10D shown in FIG. 7, the switching power supply device 10D includes an oscillator 33 to generate an oscillation signal having a fixed frequency and a phase comparator 34 to compare the frequency of the oscillation signal and the frequency of the output signal at the output terminal VOUT. Instead of the pulse generator circuit 31, the switching power supply device 10D includes a pulse generator circuit 31A to operate based on the comparison result of the phase of the phase comparator 34. The pulse generator circuit 31A, when the frequency of the output signal is higher than the frequency of the oscillation signal, the first ON-period is lengthened; when the frequency of the output signal is lower than the frequency of the oscillation signal, the first ON-period is shortened.

In the switching power supply device 10D shown in FIG. 9, the synchronized rectification type and non-insulating type switching power supply device 10D can suppress the switching loss and the electromagnetic noise. Further, in the switching power supply device 10D shown in FIG. 9, even when the input voltage Vin and the output voltage Vout or the consumption current of the load fluctuate, constant switching frequency can be kept.

(Second Variation of Second Embodiment)

Figure 10:
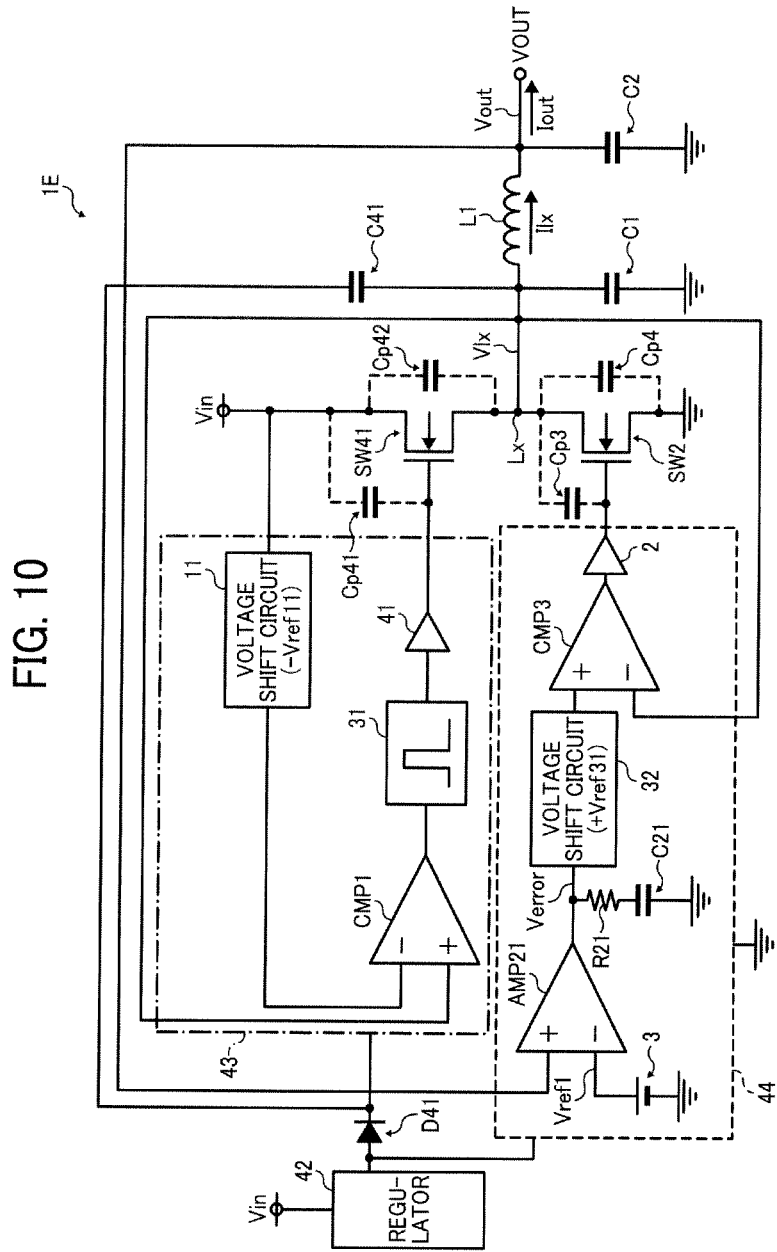
FIG. 10 is a block diagram illustrating a configuration of a switching power supply device according to a second variation of the second embodiment.

FIG. 10 is a block diagram illustrating a configuration of the switching power supply device 10E according to a second variation of the second embodiment. The switching power supply device 10E shown in FIG. 10 is configured as a boot strap type switching power supply device, based on the switching power supply device 10C shown in FIG. 7. In the bootstrap type switching power supply device 10E, as a high-side switch, Nch MOS FET that can flow a greater current than Pch MOS FET can be used. Accordingly, in the bootstrap type method is a generally used control method in the switching power supply devices that operate at a relatively high voltage.

In FIG. 10, the switching power supply device 10E includes an Nch MOS FET switch SW41 instead of the Pch MOS FET switch SW1, and a buffer 41 instead of the inverter 1 shown in FIG. 7. In FIG. 10, reference character 43 represents a first control circuit to control the switch SW41, and 44 represents a second control circuit to control the switch SW2. In addition, in FIG. 10, the switching power supply device 10E further includes a regulator 42 that drops the high input voltage. In the switching power supply device 10E shown in FIG. 10, a diode (bootstrap diode) D41 and a capacitor (bootstrap capacitor) C41 are connected in series between an output terminal of the regulator 42 and the junction node LX.

In the first control circuit 43 for the switch SW41, a voltage at a junction node between the diode D41 and the capacitor C41 functions as the power supply voltage, and a voltage Vlx at the junction node LX function as the reference voltage. In the second control circuit 44 for the switch SW2, the output voltage (dropped voltage) of the regulator 42 functions as the power supply voltage, and the ground voltage (0) functions as the reference voltage.

When the output voltage of the regulator 42 exceeds the voltage Vlx at the junction node LX, the regulator 42 charges the capacitor C10 via the diode D41. When the output voltage of the regulator 42 falls below the voltage Vlx at the junction node LX, the diode D41 is turned off. Even when the output voltage of the regulator 42 falls below the voltage Vlx at the junction node LX, the voltage across the capacitor C41 sets almost equal to the output voltage of the regulator 42.

Since the first control circuit 43 for the switch SW41 and the control circuit 44 for the switch SW2 set the output voltage (dropped voltage) of the regulator 42 to the power supply voltage, which can be configured by a low voltage-resistant element whose volumetric integrated rate is high.

In a bootstrap type conventional switching power supply device, each of control circuits corresponding to a high-side switch and a low-side switch sets the dropped voltage as the power supply voltage, and sets the ground voltage as the reference voltage. Accordingly, when the output signal of the control circuit for the high-side switch is applied to the gate of the high-side switch, a level shifter is required, but the level shifter is needed to be configured by high voltage-resistant elements. Since the high voltage-resistant element has a few current output to drive the switch, deterioration of the operational speed can be invited and disturbing the high frequency. Further, since size of the high-resistance is greater, components per chip are reduced. By contrast, since all members in the control circuit 43 for the switch SW41 is configured by low voltage-resistant elements, the switching power supply device 10E shown in FIG. 10 can be operated at high speed. Even in the switching power supply device 10E that operates at the high input voltage Vin, the switching frequency can be easily set higher.

Third Embodiment

Figure 11:
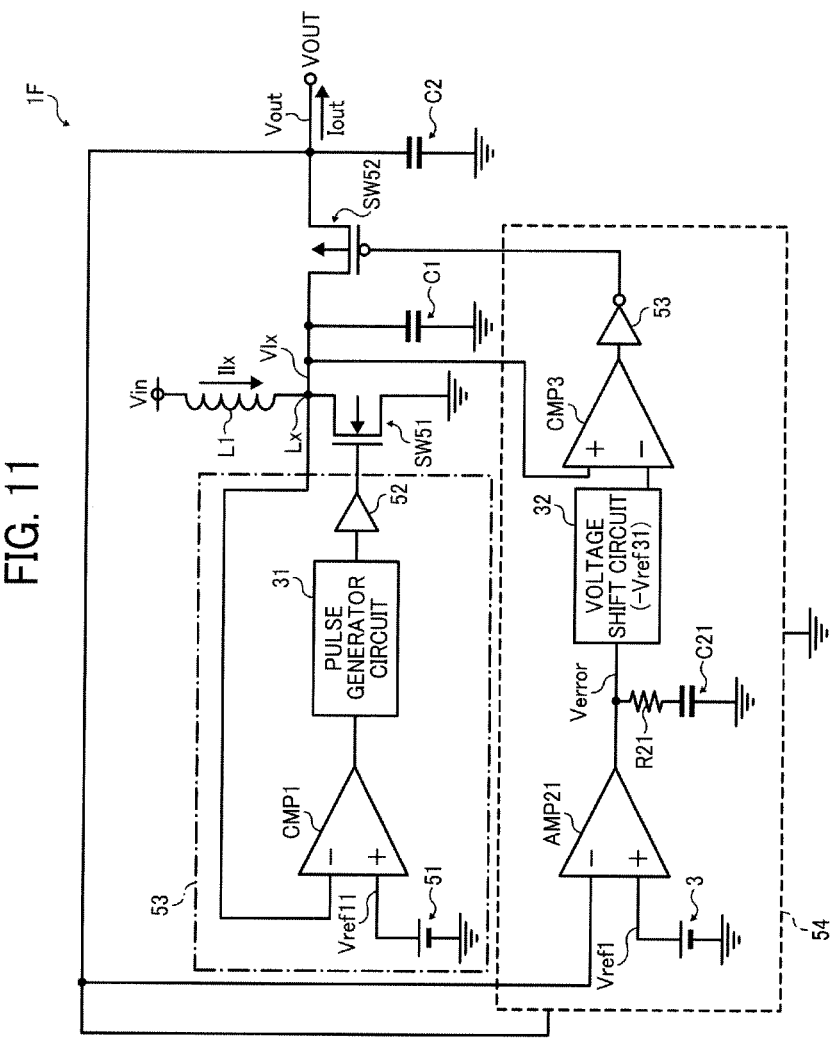
FIG. 11 is a block diagram illustrating a configuration of a switching power supply to device according to a third embodiment.

FIG. 11 is a block diagram illustrating a configuration of a switching power supply device 10F according to a third embodiment. In the above-described first and second embodiments, the switching power supply devices 10(10A, 10B, 10C) are step-down switching power supply devices. The switching power supply device 10F shown in FIG. 11 is configured as a step-up switching power supply device, based on the switching power supply device 10C shown in FIG. 7.

In FIG. 11, the switching power supply device 10F includes the inductor L1 and a switch SW51 connected in series between the voltage source of the input voltage Vin and the ground terminal, a switch SW52 connected between the output terminal VOUT and the junction node LX between the inductor L1 and the switch SW51, a capacitor C1, connected to the junction node LX, that constitutes a resonant circuit with the inductor L1, and a capacitor C2 that smoothes the output voltage Vout at the output terminal VOUT. The switches SW51 and SW52 are, for example, MOS FET. In addition, the switches SW51 and SW52 have predetermined on-resistance, thus generating the voltages across the switches SW51 and SW52 when the current flows the switches SW51 and SW52. In FIG. 11, reference character Iout represents the output current generated from the output terminal VOUT, Ilx represents the inductor current L1 flowing through the inductor L1, and Vlx represents the voltage at the junction node LX.

Herein, the switches SW51 and SW52 have parasitic resistance, similarly to the switches SW1 and SW2 shown in FIG. 7, but figure is omitted in FIG. 11.

In FIG. 11, the switching power supply device 10F includes a first control circuit 53 that controls the switch SW51, and a second control circuit 54 that controls the switch SW52.

In the switching power supply circuit shown in FIG. 11, the first control circuit 53 for the switch SW51 includes a reference voltage source 51, a comparator CMP1, a pulse generator circuit 31, and a buffer 52. In the switching power supply device 10F shown in FIG. 11, the comparator CMP1 and the pulse generator circuit 31 are configured similar to the elements of the switching power supply device 10C shown in FIG. 7. The reference voltage source 51 generates the reference voltage Vref11, similarly to the voltage used in the voltage shift circuit 11 shown in FIG. 7.

In the switching power supply device 10F shown in FIG. 11, the second control circuit 54 for the switch SW52 includes the reference voltage source 3, the error amplifier AMP21, the resistor R21, the capacitor C21, the voltage shift circuit 32, and the comparator CMP3, and an inverter 53. In the switching power supply device 10F shown in FIG. 11, the configurations of the reference voltage source 3, the error amplifier AMP2, the resistor R21, the capacitor C21, and the comparator CMP3 are similar to those of the switching power supply device 10C shown in FIG. 7. The voltage shift circuit 32 subtracts the reference voltage Vregf31 from the error voltage Verror, and the subtracted voltage is input to the non-inverting input terminal of the comparator CMP3. The control circuit 54 for the switch SW52 sets the output voltage Vout as the power supply voltage.

Figure 12:
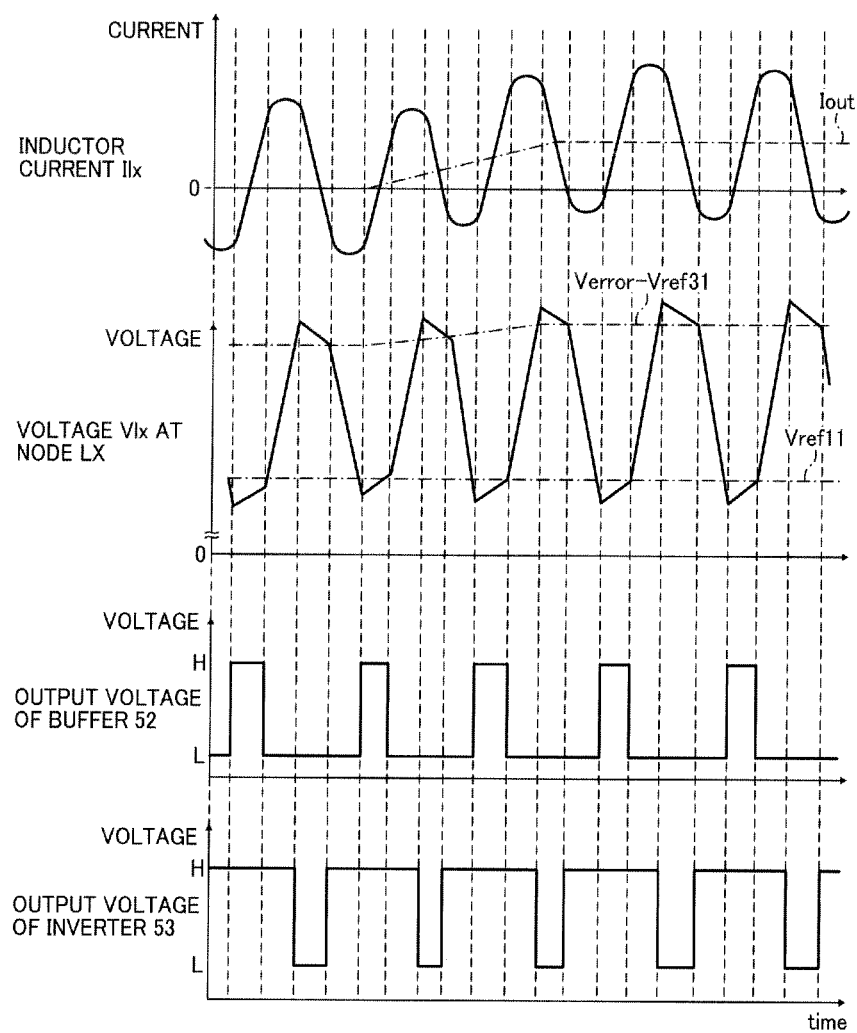
FIG. 12 is a timing chart illustrating an operation of the switching power supply device shown in FIG. 11.
Figure 13:
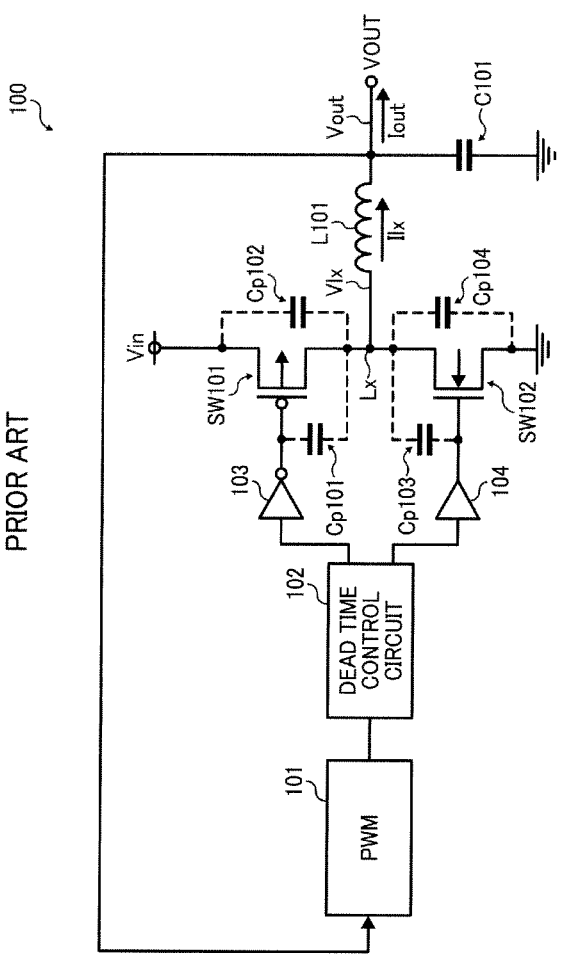
FIG. 13 is a block diagram illustrating a configuration of a related-art synchronized rectification step-down switching power supply device.

FIG. 12 is a timing chart illustrating an operation of the switching power supply device 10F shown in FIG. 11. When the voltage Vlx at the junction node LX falls below the reference voltage Vref11, the output signal of the comparator CMP1 is changed to high, the output signal of the pulse generator circuit 31 is kept high state for a predetermined first ON-period, and the switch SW51 is kept on state for the first ON-period. When the first ON-period of the switch SW51 has elapsed, the output signal of the pulse generator circuit 31 is changed to low (L), and the switch SW51 is turned off. When the switch SW51 is turned off, the inductor current Ilx increases the voltage Vlx at the junction node LX. Then, when the inductor current fix exceeds the voltage "Verror−Vref31", the output signal of the comparator CMP3 is changed to high and the switch SW52 is turned on. When the switch SW52 is turned on and the voltage Vlx falls below the voltage "Cerror−Vref31", the output signal of the comparator CMP3 is changed to low and the switch SW52 is turned off.

When the switch SW52 is turned off, the forward current flowing via the inductor L1 decreases the voltage Vlx at the junction node LX. Then, when the voltage Vlx at the junction node LX falls below the reference voltage Vref11, the switch SW51 is turned on again. As the output current Iout is increased, the output voltage Vout is decreased, and the error voltage Verror is increased. As the error voltage Verror is increased, the subtracted voltage "Verror−Vref31" is increased, and the reverse current of the inductor L1 is decreased. As described above, by decreasing the reverse current of the inductor L1, the inductor current Ilx can track the output current Iout.

Noted that, in a time period during which the state is transited to the state in which the inductor current Ilx follows the output current Iout, the length of the second ON-period of the switch SW52 fluctuates, and the switching frequency fluctuates.

As described above, as long as the switching power supply device is the synchronized rectification type, the fundamental of the present invention can be easily adopted for the both step-up switching power supply device. In addition, the fundamental of the present invention can be further adopted for the both step-up/step-down switching power supply device or a reverse-type switching power supply device.

As described above, in the first embodiment of the present disclosure, a non-insulating type switching power supply device 10, to convert an input voltage Vin into an output voltage Vout using synchronous rectification, includes an inductor L1, a first switch SW1, a second switch SW2, a first control circuit 14, and a second control circuit 15. The inductor L1 is connected to an output terminal VOUT that outputs an output voltage Vout. The first switch SW1 increases a current Ilx flowing through the inductor L1 when turned on. The second switch SW2 decreases the current Ilx flowing through the inductor L1 when turned on, connected to the first switch SW1 via an intermediate junction node Lx that is connected to the inductor L1. The first control circuit 14 controls the first switch SW, including a reference voltage source 3 to generate a reference voltage Vref1. The second control circuit 15 controls the second switch SW2. While the first switch SW1 and the second switch SW2 are off, a voltage at the intermediate junction node Lx between the first switch SW1 and the second switch SW2 is decreased when a forward current flows through the inductor L1, and is increased when a reverse current flows through the inductor L. The first control circuit 14 turns the first switch SW1 on while the first switch SW1 and the second switch SW2 are off and when the voltage at the intermediate junction node Lx is increased so as to decrease a voltage across the first switch SW to or below a first threshold voltage (0), turns the first switch SW1 off when a predetermined first ON-period has elapsed from when the first switch SW1 is turned on, and lengthens the first ON-period as the output voltage Vout becomes smaller relative to the reference voltage Vref1. The second control circuit 15 turns the second switch SW2 on when the first switch SW1 and the second switch SW1 are off, and a voltage across the second switch SW2 is decreased to or below a second threshold voltage. The second control circuit 15 turn the second switch SW2 off when the second switch SW2 is on, and a reverse current flows through the inductor L1, sufficient to increase the voltage Vlx at the intermediate junction node Lx so as to decrease the voltage across the first switch SW1 to or below the first threshold voltage after the second switch SW2 is turned off.

With this switching power supply device 10, zero-volt switching (ZVS) can be achieved, using the inductor current Ilx flowing while both the first switch SW1 and the second switch SW2 are off. Therefore, the switching loss is very small, and the switching power supply device 10 can be operated at a low frequency. Accordingly, if the switching frequency is set to high, high efficiency can be accomplished.

In addition, the second control circuit 15 shown in FIG. 1 detects a magnitude of the reverse current of the inductor L1 by detecting the voltage across the second switch SW2 generated by an on-resistance of the second switch SW2. Alternatively, the second control circuit further comprises a resistor connected in series to the inductor L1, and the second control circuit 15 detects a magnitude of the reverse current of the inductor L1 by detecting a voltage across the sense resistor.

With this switching power supply device 10, in order to detect the magnitude of the reverse current of the inductor L1, by using the on-resistance of the second switch SW2, or the sense resistor, the second control circuit 15 can be configured by a small number of components.

In the switching power supply device IA shown in FIG. 4, the first control circuit 14 turns the first switch SW1 off, when the first switch SW1 is off, the output voltage Vout is increased to exceed the reference voltage Vref1, and a forward current flows through the inductor L1, sufficient to decrease the voltage Vlx at the intermediate junction node Lx so as to decrease the voltage across the second switch SW2 to or below the second threshold voltage Vref2 after the first switch SW1 is turned off.

With this switching power supply device IA, by detecting the forward current of the inductor L1, after the first switch SW1 is turned off, a state in which zero-volt switching of the second switch SW2 can be achieved can be surely realized. Therefore, malfunction of the switches SW1 and SW2 (e.g., the second switch is turned on after the first witch is turned off) can be prevented.

Further, the first control circuit 16 shown in FIG. 4 detects a magnitude of the forward current of the inductor L1 by detecting the voltage across the first switch SW1 generated by an on-resistance of the first switch SW1. Alternatively, the first control circuit 16 further includes a sense resistor connected in series to the inductor L1, and detects a magnitude of the forward current of the inductor L1 by detecting a voltage across the sense resistor.

With this switching power supply device, by using on-resistance of the first switch SW1 or the sense resistor to detect the magnitude of the forward current of the inductor L1, the first control circuit 16 can be configured by a small number of components.

In the switching power supply devices 10(10A) shown in FIGS. 1 and 4, the first ON-period corresponds a time period from when the first switch SW1 is turned on to when the output voltage Vout is increased to exceed the reference voltage Vref1.

With this switching power supply device 10(10A), because the comparator compares the output voltage and the reference voltage to adjust ON-period of the first switch, the first control circuit is configured by a small number of components.

In the switching power supply device 10B shown in FIG. 5, the first control circuit 17 further includes a capacitor C22, and the first ON-period corresponds to a time period from when the first switch SW1 is turned on to charge the capacitor C22 to when the voltage Vslope across the capacitor C22 reaches a voltage corresponding to an error Verror between the output voltage Vout and the reference voltage Vref1.

With this switching power supply device 10B, since the ON-period of the first switch SW1 is adjusted by the error amplifier AMP21, the output voltage Vout can be controlled with a high degree of accuracy.

In the second embodiment of the present disclosure shown in FIG. 7, a non-insulating type switching power supply device 10C to convert an input voltage into an output voltage, using synchronous rectification, includes an inductor L1, a first switch SW1, a second switch SW2, a first control circuit 43, and a second control circuit 44. The inductor L1 is connected to an output terminal VOUT that outputs the output voltage Vout. The first switch SW1 increases a current flowing through the inductor L1 when turned on. The second switch SW2 decreases the current flowing through the inductor when turned on, connected to the first switch SW1 via an intermediate junction node Lx that is connected to the inductor L1. The first control circuit 43 controls the first switch SW1. The second control circuit 44 controls the second switch SW2, including a reference voltage source 3 to generate a reference voltage Vref1. While the first switch SW1 and the second switch SW2 are off, the voltage Vlx at the intermediate junction node Lx between the first switch SW1 and the second switch SW2 is decreased when a forward current flows through the inductor L1, and is increased when a reverse current flows through the inductor L1. The first control circuit 43 turns the first switch SW1 on while the first switch SW1 and the second switch SW2 are off, and when the voltage Vlx at the intermediate junction node Lx is increased so as to decrease a voltage across the first switch SW1 to or below a first threshold voltage (0), and turns the first switch SW1 off when a predetermined first ON-period has elapsed from when the first switch SW1 is turned on. The second control circuit 44 turns the second switch SW2 on while the first switch SW1 and the second switch SW2 are off, and when the voltage Vlx at the intermediate junction node Lx is decreased so as to decrease a voltage across the second switch SW2 to or below a second threshold voltage Vref2, and turns the second switch SW2 off when a predetermined second ON-period has elapsed from when the second switch SW2 is turned on, and lengthens the second ON-period as the output voltage Vout decreases relative to the reference voltage Vref1.

With this switching power supply device 1C, by setting the first ON-period of the first switch SW1 at constant, almost constant switching frequency can be obtained.

In the switching power supply device 1C shown in FIG. 7, the second control circuit 44 turns the second switch SW2 off, when the predetermined second ON-period has elapsed from when the second switch SW2 is turned on, and a reverse current flows through the inductor L1, sufficient to increase the voltage Vlx at the intermediate junction node Lx so as to decrease the voltage across the first switch SW1 to or below the first threshold voltage (0) after the second switch SW2 is turned off.

With this switching power supply device 1C, by detecting the reverse current of the inductor L1, after the second switch SW2 is turned off, a state in which zero-volt switching of the first switch SW1 can be achieved can be surely realized, thus preventing the malfunction of the switches SW1 and SW2 (e.g., the second switch is turned on after the first switch is turned off).

Further, the second control circuit 44 shown in FIG. 7 detects a magnitude of the reverse current of the inductor L1 by detecting the voltage across the second switch SW2 generated by an on-resistance of the second switch SW2. Alternatively, the second control circuit 44 further includes a sense resistor connected in series to the inductor L1, and the second control circuit 44 detects a magnitude of the reverse current of the inductor L1 by a voltage across the sense resistor.

With the present switching power supply device 1C, by using on-resistance of the second switch SW2 or the sense resistor to detect the magnitude of the reverse current of the inductor L1, the second control circuit 44 is configured by a small number of components.

The switching power supply device 10D shown in FIG. 9, further includes an oscillator 33 to generate an oscillation signal that has a fixed frequency; a phase comparator 34 to compare the frequency of the oscillation signal with a frequency of an output signal generated by the output voltage Vout at the output terminal VOUT. When the frequency of the output signal is greater than the frequency of the oscillation signal, the first control circuit 43' lengthens the first ON-period, and when the frequency of the output signal is greater than the frequency of the oscillation signal, the first control circuit 43' shortens the first ON-period.

With the present switching power supply device 10D, by adjusting the ON-period of the first switch SW1 so that the frequency of the output signal of the switching power supply device 10D matches the frequency of the oscillator 33, the present switching power supply device 10D can be operated at a desired switching frequency.

As alternative configuration of the above-described switching power supply devices, the reference voltage may be compared with a dividing voltage divided from the output voltage. Herein, although the reference voltage Vref1 is the fixed value, the output voltage Vout may be divided by a feedback resistor to have a voltage determined by user settings.

With the power supply device of the present disclosure, by using a capacitor that constitutes a resonant circuit with an inductor, a slew rate can be decreased. Therefore, the currents of output signals output from the first control circuit and the second control circuit to drive the first switch and the second switch can be reduced.

The switching power supply device can be adaptable to step-down, step-up, step-up/step-down, and reverse switching power supply devices.

Herein, the material and shape of the switching power supply device are not limited to the above-described embodiments, and various modifications and improvements in the material and shape of the switching power supply device are possible without departing from the spirit and scope of the present invention.

Numerous additional modifications and variations are possible in light of the above teachings. It is therefore to be understood that, within the scope of the appended claims, the disclosure of this patent specification may be practiced otherwise than as specifically described herein.

What is claimed is:

1. A non-insulating type switching power supply device, to convert an input voltage into a predetermined output voltage, using synchronized rectification; comprising:
    an inductor, connected to an output terminal of the device that outputs the output voltage;
    a first switch to increase a current flowing through the inductor when turned on;
    a second switch to decrease the current flowing through the inductor when turned on, connected to the first switch via an intermediate junction node that is connected to the inductor;
    a first control circuit to control the first switch, comprising a first reference voltage source to generate a first reference voltage; and
    a second control circuit to control the second switch, comprising a second reference voltage source to generate a second reference voltage;
    wherein, while the first switch and the second switch are off, a voltage at the intermediate junction node between the first switch and the second switch is decreased when a forward current flows through the inductor, and is increased when a reverse current flows through the inductor,
    wherein when the first switch and the second switch are off and the voltage at the intermediate junction node is increased so as to decrease a voltage across the first switch to or below a first threshold voltage, the first control circuit turns the first switch on for a predetermined first on-period, and then the first control circuit turns the first switch off when the predetermined first ON-period has elapsed from when the first switch is turned on, and lengthens the first ON-period as the output voltage decreases relative to the first reference voltage,
    wherein, the second control circuit turns the second switch on when the first switch and the second switch are off and a voltage across the second switch is decreased to or below a second threshold voltage, and then the second control circuit turns the second switch off when the second switch is on and a reverse current flowing through the inductor is sufficient to increase the voltage at the intermediate junction node so as to decrease the voltage across the first switch to or below the first threshold voltage after the second switch is turned off,
    wherein when the first switch is off and the second switch is on, the second reference voltage source of the second control circuit generates a reference voltage corresponding to the voltage across the second switch by flowing a predetermined reverse current to the inductor.

2. The switching power supply device according to claim 1, wherein the second control circuit detects a magnitude of the reverse current of the inductor by detecting the voltage across the second switch generated by an on-resistance of the second switch.

3. The switching power supply device according to claim 1, wherein the second control circuit further comprises a sense resistor connected in series to the inductor and detects a magnitude of the reverse current of the inductor by a voltage across the sense resistor.

4. The switching power supply device according to claim 1, wherein the first control circuit turns the first switch off, when the first switch is on, the output voltage is increased to exceed the first reference voltage, and a forward current flows through the inductor, sufficient to decrease the voltage at the intermediate junction node so as to decrease the voltage across the second switch to or below the second threshold voltage after the first switch is turned off.

5. The switching power supply device according to claim 4, wherein the first control circuit detects a magnitude of the forward current of the inductor by detecting the voltage across the first switch generated by an on-resistance of the first switch.

6. The switching power supply device according to claim 4, wherein the first control circuit further comprises a sense resistor connected in series to the inductor, and detects a magnitude of the forward current of the inductor by a voltage across the sense resistor.

7. The switching power supply device according to claim 1, wherein the first ON-period corresponds a time period from when the first switch is turned on to when the output voltage is increased to exceed the first reference voltage.

8. The switching power supply device according to claim 1, wherein the first control circuit further comprises a capacitor, wherein the first ON-period corresponds to a time period when the first switch is turned on to charge the capacitor to when the voltage across the capacitor reaches a voltage corresponding to an error between the output voltage and the first reference voltage.

9. A non-insulating type switching power supply device to convert an input voltage into a predetermined output voltage, using synchronized rectification, comprising:
    an inductor, connected to an output terminal of the device that outputs the output voltage;
    a first switch to increase a current flowing through the inductor when turned on;
    a second switch to decrease the current flowing through the inductor when turned on, connected to the first switch via an intermediate junction node that is connected to the inductor;
    a first control circuit to control the first switch; and
    a second control circuit to control the second switch, comprising a reference voltage source to generate a reference voltage,
    wherein, while the first switch and the second switch are off, a voltage at the intermediate junction node between the first switch and the second switch is decreased when a forward current flows through the inductor, and is increased when a reverse current flows through the inductor,
    wherein when the first switch and the second switch are off, and the voltage at the intermediate junction node is increased so as to decrease a voltage across the first switch to or below a first threshold voltage, the first control circuit turns the first switch on for a predetermined first on-period, and then the first control circuit turns the first switch off when the predetermined first ON-period has elapsed from when the first switch is turned on,
    wherein the second control circuit turns the second switch off, when the predetermined second ON-period has elapsed from when the second switch is turned on and a reverse current flowing through the inductor is sufficient to increase the voltage at the intermediate junction node so as to decrease the voltage across the first switch to or below the first threshold voltage after the second switch is turned off; and
    wherein when the first switch is off and the second switch is on, the reference voltage source of the second control circuit generates a reference voltage corresponding to the voltage across the second switch by flowing a predetermined reverse current to the inductor.

10. The switching power supply device according to claim 9, wherein the second control circuit turns the second switch on when the first switch and the second switch are off and the voltage at the intermediate junction node is decreased so as to decrease a voltage across the second switch to or below a second threshold voltage, and then the second control circuit turns the second switch off when a predetermined second ON-period has elapsed from when the second switch is turned on, and lengthens the second ON-period as the output voltage decreases relative to the reference voltage.

11. The switching power supply device according to claim 9, wherein the second control circuit detects a magnitude of the reverse current of the inductor by detecting the voltage across the second switch generated by an on-resistance of the second switch.

12. The switching power supply device according to claim 9, wherein the second control circuit further comprises a sense resistor connected in series to the inductor, and detects a magnitude of the reverse current of the inductor by a voltage across the sense resistor.

13. The switching power supply device according to claim 9, further comprising:
    an oscillator to generate an oscillation signal that has a fixed frequency; and
    a phase comparator to compare the frequency of the oscillation signal with a frequency of an output signal generated by the output voltage at the output terminal,
    wherein, when the frequency of the output signal is greater than the frequency of the oscillation signal, the first control circuit lengthens the first ON-period, and
    when the frequency of the output signal is smaller than the frequency of the oscillation signal, the first control circuit shortens the first ON-period.

* * * * *